United States Patent
Hamada

(10) Patent No.: US 8,737,831 B2
(45) Date of Patent: May 27, 2014

(54) DIGITAL PHOTOGRAPHING APPARATUS AND METHOD THAT APPLY HIGH-SPEED MULTI-AUTOFOCUSING (AF)

(75) Inventor: Masataka Hamada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/984,003

(22) Filed: Jan. 4, 2011

(65) Prior Publication Data

US 2011/0164867 A1    Jul. 7, 2011

(30) Foreign Application Priority Data

Jan. 7, 2010   (KR) .................. 10-2010-0001320

(51) Int. Cl.
*G03B 3/10* (2006.01)
(52) U.S. Cl.
USPC .......................................... 396/123; 396/121
(58) Field of Classification Search
USPC .................. 396/104, 121, 123; 348/349, 353
See application file for complete search history.

(56) References Cited

U.S. PATENT DOCUMENTS

| 4,905,032 A | 2/1990 | Ishida et al. |
| 5,315,339 A | 5/1994 | Hamada et al. |
| 7,499,096 B2 * | 3/2009 | Yamazaki ..................... 348/348 |
| 2006/0072915 A1 * | 4/2006 | Onozawa ...................... 396/121 |

FOREIGN PATENT DOCUMENTS

| JP | 2003-195151 A | 7/2003 |
| JP | 3797543 B2 | 7/2006 |

* cited by examiner

*Primary Examiner* — Clayton E Laballe
*Assistant Examiner* — Noam Reisner
(74) *Attorney, Agent, or Firm* — Drinker Biddle & Reath LLP

(57) ABSTRACT

A digital photographing apparatus that supports a fast multi-autofocusing (AF) method, in which, when AF peaks of a subject of a central multi-point and a subject of a nearest multi-point are detected, further scanning is not performed. In addition, scanning is not performed on a region from which it is difficult to detect a peak, so that fast and accurate AF may be performed.

18 Claims, 34 Drawing Sheets

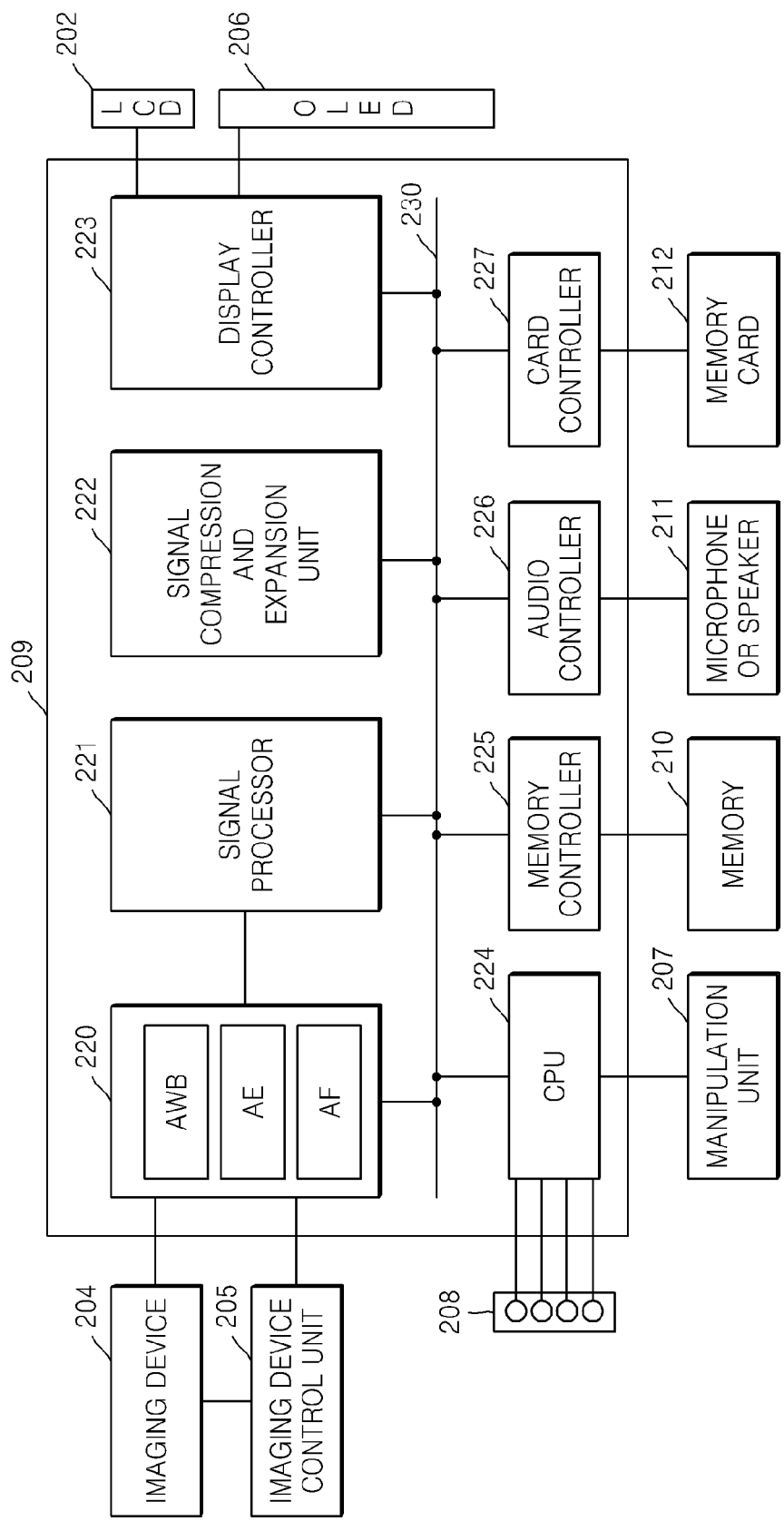

FIG. 6

| PHOTOGRAPHING MAGNIFICATION / f | f ≥ 35mm | f < 35mm | POSITION OF MAIN SUBJECT |
|---|---|---|---|
| REGION WITH HIGH MAGNIFICATION | EQUAL TO OR MORE THAN 1/20 | EQUAL TO OR MORE THAN 1/20 | PREFERENCE OF CENTRAL MULTI-POINT (BASIS: CENTER OF AF REGION) |
| REGION WITH MIDDLE MAGNIFICATION | 1/20~1/150 | LESS THAN 1/20 | PREFERENCE OF CENTRAL MULTI-POINT (BASIS: DISTANCE) |
| REGION WITH LOW MAGNIFICATION | LESS THAN 1/150 | | PREFERENCE OF NEAR REGION (BASIS: DISTANCE) |

FIG. 7A         FIG. 7B

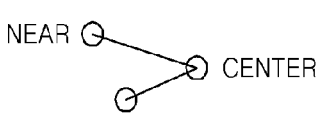

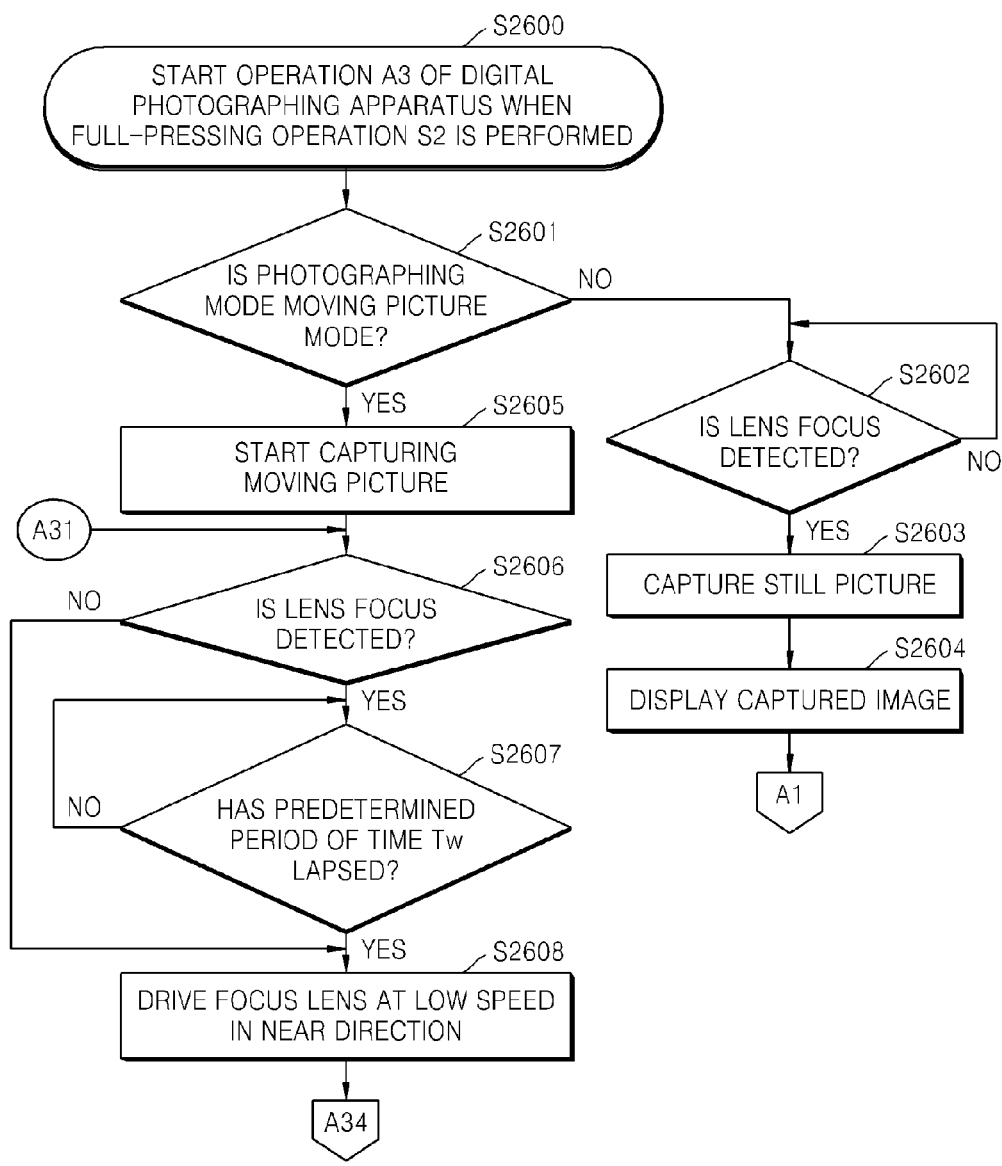

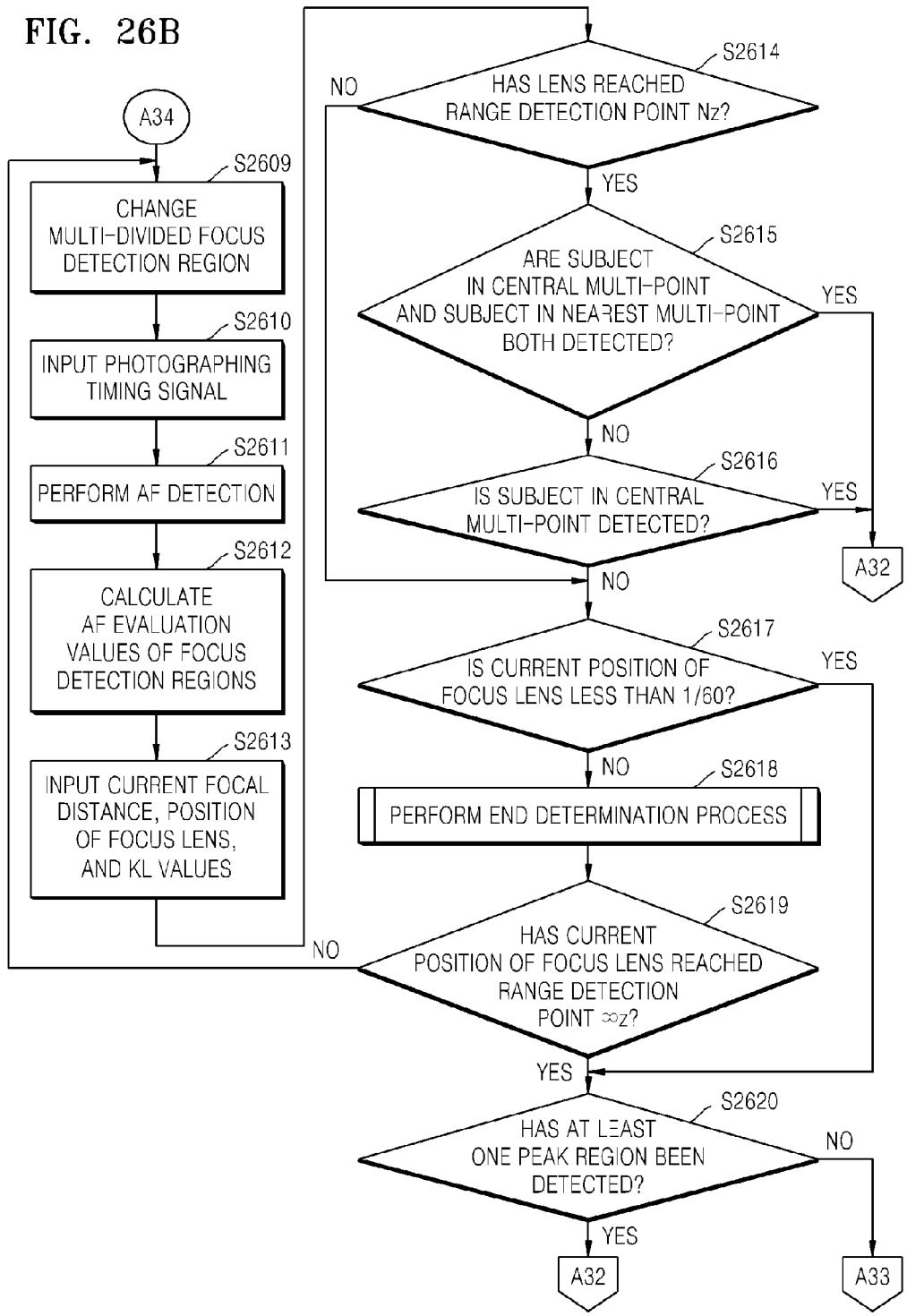

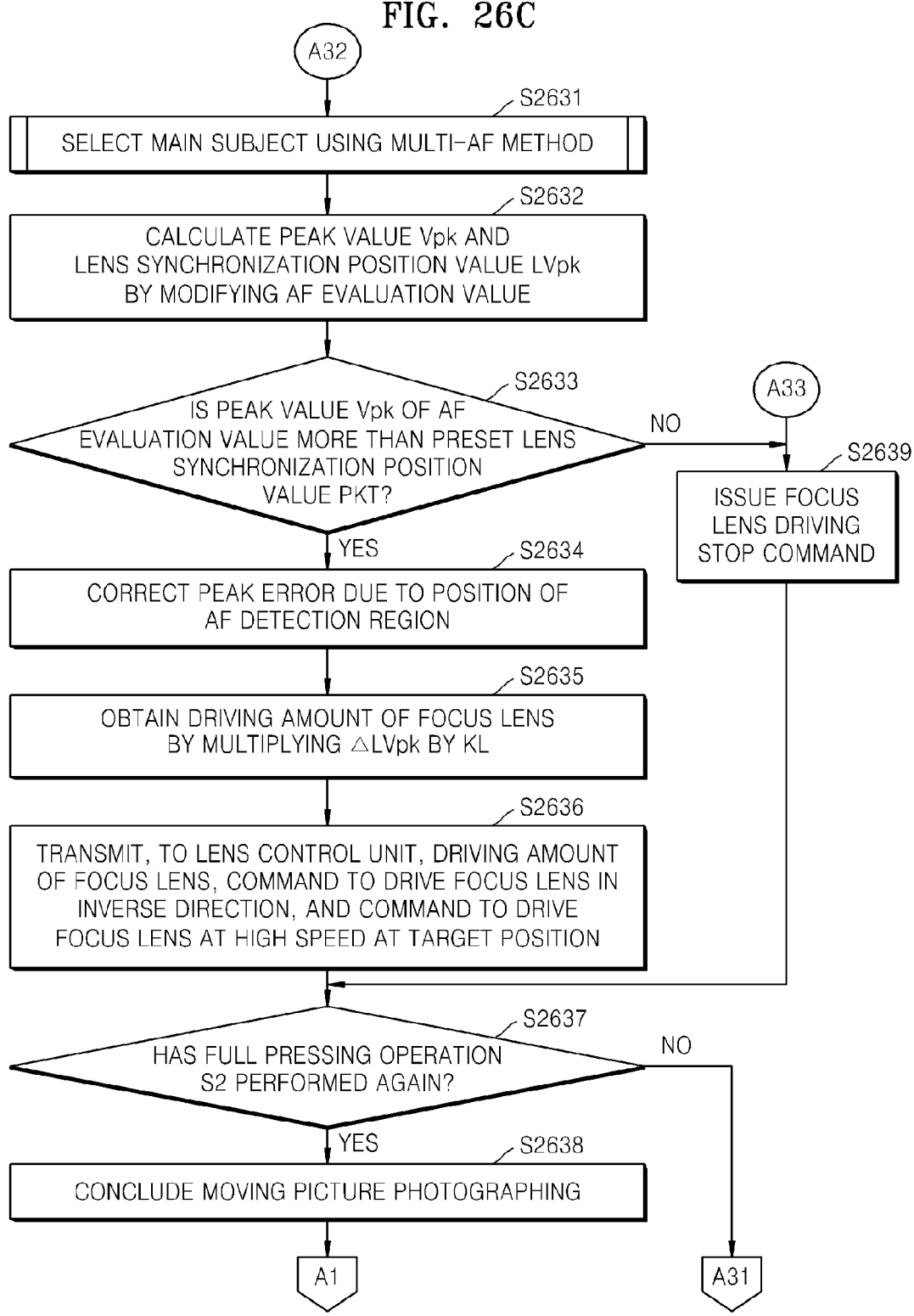

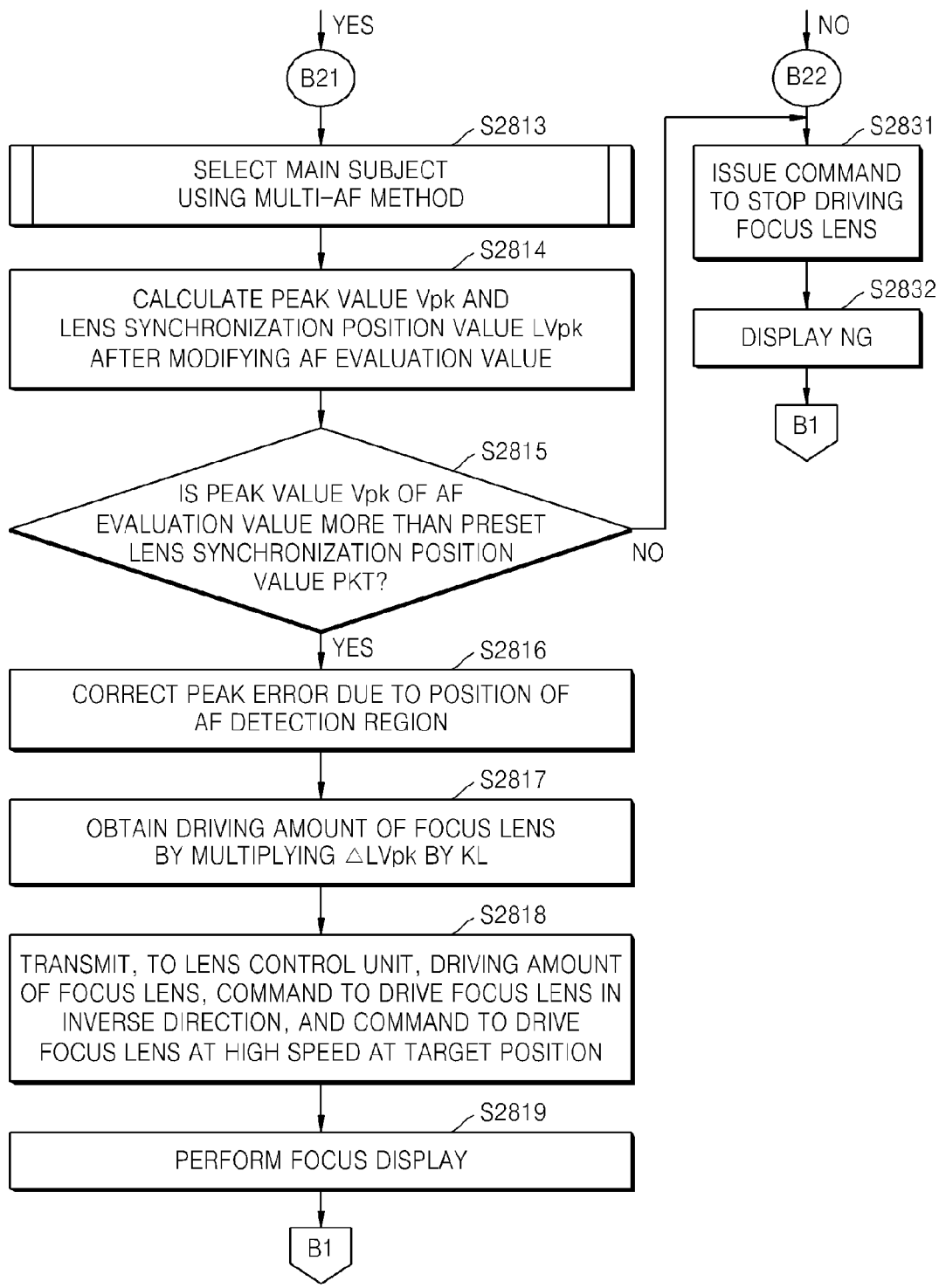

DIGITAL PHOTOGRAPHING APPARATUS AND METHOD THAT APPLY HIGH-SPEED MULTI-AUTOFOCUSING (AF)

CROSS-REFERENCE TO RELATED PATENT APPLICATION

This application claims the priority benefit of Korean Patent Application No. 10-2010-0001320, filed on Jan. 7, 2010, in the Korean Intellectual Property Office, the entire disclosure of which is incorporated herein by reference.

BACKGROUND

1. Field of the Invention

Embodiments relate to applying multi-autofocusing (AF) in digital photographing apparatuses. More particularly, embodiments relate to a method of applying high-speed multi-AF by using a contrast AF in digital photographing apparatuses.

2. Description of the Related Art

In conventional multi-point-autofocusing (hereinafter, multi-AF) based on a contrast AF method, a focus lens is moved to an infinite location and then scans the entire region between the focus lens and a subject. Thereafter, the multi-AF method is applied. Accordingly, detection of a main subject is possible only after the entire region is scanned. Thus, AF speed is reduced.

In a conventional method using a multi-AF method by mixing an external light AF method and a contrast AF method, a scan range is restricted by the external light AF method. In this conventional method, a scan time required to apply the contrast AF method may be decreased, but it takes time to perform the external light AF method. Thus, the overall AF speed is still low. In addition, the size and cost of a camera increases in order to achieve the external light AF method.

SUMMARY

Embodiments provide a digital photographing apparatus that performs a high-speed multi-autofocusing (AF) method by using contrast AF. More particularly, embodiments provide a high-speed digital photographing apparatus capable of performing a multi-AF method without needing to scan the entire region between a focus lens and a subject.

According to an embodiment, a digital photographing apparatus that applies a high-speed multi-autofocusing (AF) method, the digital photographing apparatus comprises: a photographing lens; an image pickup unit that converts image light obtained from a subject through the photographing lens into an electrical signal to generate an image signal; a driving unit for driving a focus lens of the photographing lens; a calculation unit for calculating an AF evaluation value by performing AF on the image signal; a multi-AF detection unit that detects a peak of an AF evaluation value of each multi-point into which a captured image formed by the image signal is divided; a scanning unit for scanning respective peaks of the multi-points of the captured image; and a region detection unit for determining a range of potential peak (RPP) and for inverting a driving direction of the focus lens when the location of the focus lens is outside the RPP, wherein the scanning unit scans around a final end in the near direction or a final end in the ∞ direction.

The digital photographing apparatus may further comprise a main subject determination unit that selects one of the peaks detected by the scanning unit according to a predetermined multi-AF method and determining a subject corresponding to the selected peak as a main subject, and performing contrast AF on the main subject.

When at least one of the peaks of a central multi-point or a nearest multi-point is not detected, the scanning unit may perform scanning until both peaks of the central multi-point and the nearest multi-point are detected.

The main subject determination unit may select the peak of a central multi-point or a nearest multi-point according to a predetermined multi-AF method, determines a subject corresponding to the multi-point where the peak is selected as a main subject, and may perform the contrast AF on the main subject.

The region detection unit may determine the range of potential peak (RPP) by a possibility that at least one peak would exist therein, wherein the possibility is determined according to whether the AF evaluation value monotonically increases or monotonically decreases at each lens synchronization position.

When the AF evaluation value monotonically increases, the region detection unit may determine that a peak exists in a direction of scanning, and may continue scanning up to the final end.

When the AF evaluation value monotonically decreases, the region detection unit may determine that no peaks exist in the direction of scanning, and may invert the driving direction of the focus lens at the range detection point.

A range detection point may be previously determined on the basis of a photographing iris value F and a permissible circle of uncertainty δ; and the region detection unit may determine the RPP at the range detection point, wherein the range detection point is located around the final end in a near direction or the final end in a ∞ direction When both the peaks of the central multi-point and the nearest multi-point are detected, the scanning unit may not perform further scanning.

When the peak of the central multi-point is not detected even when scanning was performed until a predetermined magnification, the scanning unit may perform scanning only until the predetermined magnification and may no longer scan a peak of the central multi-point.

When the predetermined magnification is ⅟60, the main subject determination unit may determine a subject corresponding to the peak of the nearest multi-point as the main subject.

When the predetermined magnification is ⅟100, the main subject determination unit may determine a subject corresponding to the peak of the nearest multi-point as the main subject.

Another embodiment includes a digital photographing apparatus that applies a high-speed multi-AF method. The digital photographing apparatus comprising: a multi-AF detection unit that detects a peak of an AF evaluation value of each multi-point into which a captured image formed by an image signal is divided; a scanning unit that scans respective peaks of the multi-points of the captured image; a region detection unit that inverts a direction of scanning when the location of a focus lens is determined outside a range of potential peak (RPP) during scanning around a final end in a near direction or a final end in a ∞ direction by the scanning unit; and a main subject determination unit that selects one of the peaks detected by the scanning unit according to a predetermined multi-AF method and determining a subject corresponding to the selected peak as a main subject and performing the contrast AF on the main subject.

The region detection unit may determine the RPP by a possibility that at least one peak would exist therein, wherein the possibility is determined according to whether the AF evaluation value monotonically increases or monotonically decreases at each lens synchronization position.

A range detection point may be previously determined on the basis of a photographing iris value F and a permissible circle of uncertainty δ; and the region detection unit may determine the RPP at the range detection point, wherein the range detection point is located around the final end in a near direction or the final end in a ∞ direction.

The scanning unit may further scan peaks of a central multi-point or a nearest multi-point of the captured image when at least one of the peaks of the central multi-point or the nearest multi-point of the captured image is not detected.

The main subject determination unit may select one of the peaks of the central multi-point and the nearest multi-point detected by the scanning unit according to the predetermined multi-AF method and determines a subject corresponding to the selected peak as the main subject and may perform contrast AF detection on the main subject.

Another embodiment includes a method of supporting a high-speed multi-AF method in a digital photographing apparatus. The method comprising: detecting a peak of an AF evaluation value of each multi-point into which a captured image formed by an image signal is divided; performing scanning to detect respective peaks of multi-points of the captured image; inverting a direction of scanning when a region from which no peaks are likely to be detected is detected during scanning performed on a place around a final end in a near direction or a final end in a ∞ direction in the performing of the scanning; and selecting one of the peaks detected in the performing of the scanning according to a predetermined multi-AF method and determining a subject corresponding to the selected peak as a main subject and performing the contrast AF on the main subject.

The inverting of the direction of scanning may comprise determining the region from which no peaks are likely to be detected according to whether the AF evaluation value monotonically increases or monotonically decreases at each lens synchronization position.

The region from which no peaks are likely to be detected may be determined at a range detection point, and the range detection point may be previously determined on the basis of a photographing iris value F and a permissible circle of uncertainty δ, wherein the range detection point is located around the final end in the near direction or the final end in the ∞ direction.

When at least one of the peaks of a central multi-point or a nearest multi-point of the captured image is not detected, the performing of scanning may perform scanning until both peaks of the central multi-point and the nearest multi-point are detected.

The selecting of one of the peaks detected may comprise selecting one of the peaks of the central multi-point and the nearest multi-point detected by the scanning unit according to the predetermined multi-AF method and determining a subject corresponding to the selected peak as the main subject and performing the contrast AF on the main subject.

BRIEF DESCRIPTION OF THE DRAWINGS

The above and other features and advantages will become more apparent by describing in detail exemplary embodiments thereof with reference to the attached drawings in which:

FIG. 2 is a block diagram of a camera control unit included in the digital photographing apparatus according to the embodiment illustrated in FIG. 1;

FIG. 6 illustrates a table for explaining a near and central mixed focus selection method conventionally used in a phase difference AF method;

FIGS. 7A and 7B illustrate an exemplary multi-AF method that adaptively uses a nearest multi-point focus selection method or a central multi-point focus selection method;

FIGS. 26A, 26B, and 26C are flowcharts of an operation of the digital photographing apparatus when the shutter release button is fully pressed, according to an embodiment;

FIGS. 28A and 28B are flowcharts of an operation of an all-in-one camera which is an example of an all-in-one digital photographing apparatus, according to an embodiment;

DETAILED DESCRIPTION OF THE INVENTION

Exemplary embodiments will now be described more fully with reference to the accompanying drawings.

Structure and operation of digital photographing apparatus

Figure 1:
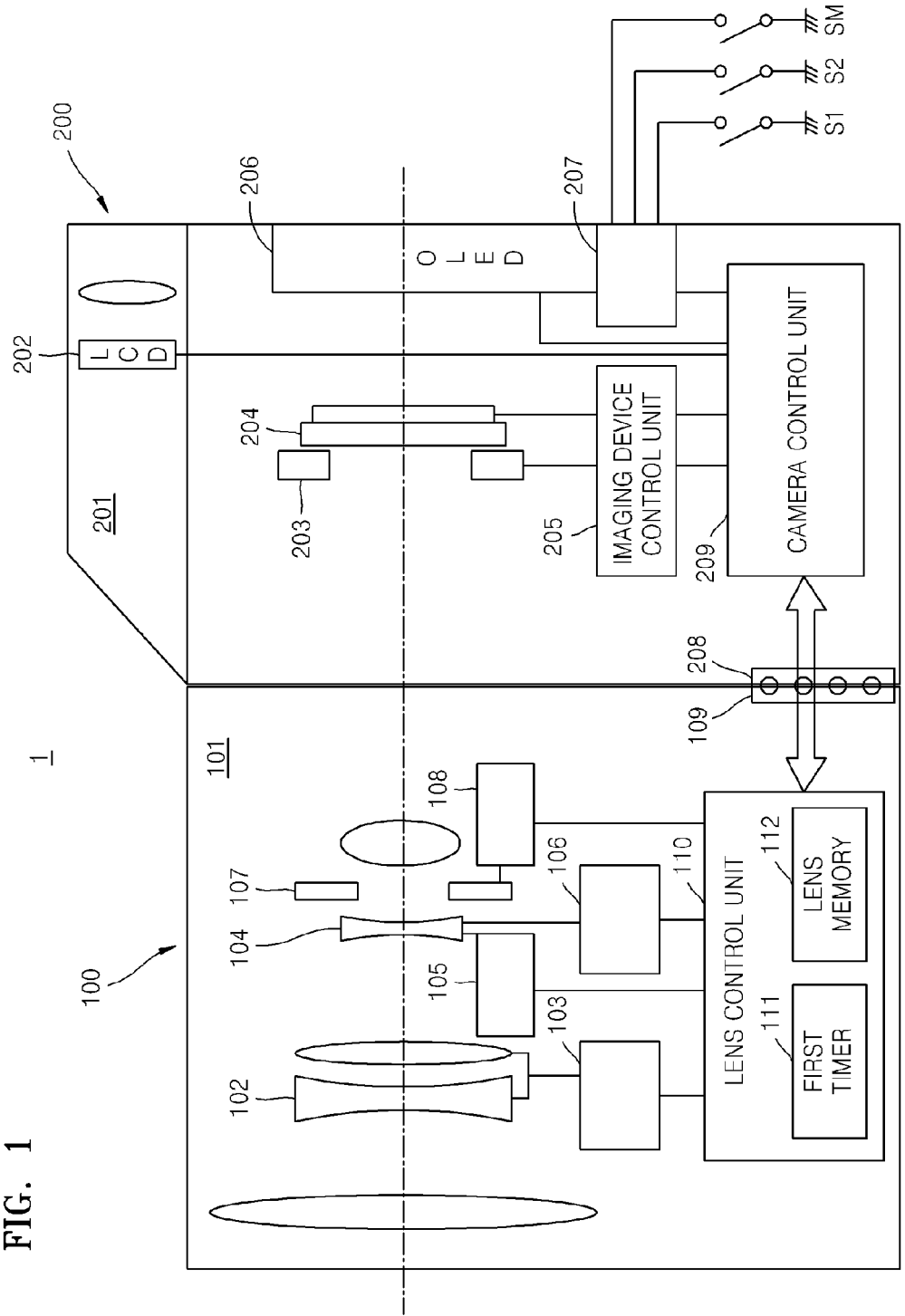
FIG. 1 is a schematic diagram of a digital photographing apparatus according to an embodiment.

FIG. 1 is a schematic diagram of a digital photographing apparatus 1, according to an embodiment.

Referring to FIG. 1, the digital photographing apparatus 1 according to the present embodiment includes an interchangeable photographing lens unit 100 and a body unit 200. The interchangeable photographing lens unit 100 may detect whether a focus of a captured image is in an in-focus state or not, and the body unit 200 includes a function that facilitates the interchangeable photographing lens unit 100 to drive a focus lens 104.

The interchangeable photographing lens unit 100 (hereinafter, referred to as a lens 100) includes an image-forming optical system 101, a zoom lens position detecting sensor 103, a lens driving actuator 105, a focus lens position detecting sensor 106, an iris driving actuator 108, a lens control unit 110, and a lens mount 109.

The image-forming optical system 101 may include a zoom lens 102 that performs zoom control, a focus lens 104 that changes a focusing position, and an iris 107. Each of the zoom lens 102 and the focus lens 104 may include a lens group.

The zoom lens position detecting sensor 103 and the focus lens position detecting sensor 106 detect the positions of the zoom lens 102 and the focus lens 104, respectively. Timing of when the position of the focus lens 104 is detected may be set by the lens control unit 110 or a camera control unit 209, which is to be described later. For example, the timing of when the position of the focus lens 104 is detected may be when AF detection with respect to an image signal is performed.

The lens driving actuator 105 and the iris driving actuator 108 drive the focus lens 104 and the iris 107, respectively, under the control of the lens control unit 110. In particular, the lens driving actuator 105 drives the focus lens 104 along an optical axis.

The lens control unit 110 includes a first timer 111 that measures time, and a lens memory 112 that stores information about lens characteristics. The lens control unit 110 transmits information about the position of the focus lens 104 to the body unit 200. If the position of the focus lens 104 is changed or the camera control unit 209 requests position information about the focus lens 104, the lens control unit 110 may transmit the information about the position of the focus lens 104 to the body unit 200. The first timer 111 may be reset by a reset signal output from the body unit 200, and the lens 100 and the body unit 200 may be synchronized with each other by the reset operation.

The lens mount 109 includes a lens-side communication pin and is engaged with a camera-side communication pin, which is to be described later, so as to serve as a transport path for data, control signals, and the like.

A structure of the body unit 200 will now be described.

The body unit 200 may include a viewfinder (for example, an electronic viewfinder (EVF)) 201, a shutter 203, an imaging device 204, an imaging device control unit 205, a display 206, a manipulation unit 207, a camera mount 208, and a camera control unit 209.

The viewfinder 201 may include a liquid crystal display (LCD) 202 built therein, and may view a captured image in real time.

The shutter 203 determines a time during which light is applied to the imaging device 204, that is, an exposure time.

The imaging device 204 converts light that has passed through the image-forming optical system 101 of the lens 100 into an image signal. The imaging device 204 may include a plurality of photoelectric conversion units arranged in a matrix, and a vertical or/and horizontal transport path for moving electric charge from the photoelectric conversion units in order to read out an image signal. The imaging device 204 may be a charge coupled device (CCD) sensor, a complementary metal oxide semiconductor (CMOS) sensor, or the like.

The imaging device control unit 205 generates a timing signal and controls the imaging device 204 to capture an image in synchronization with the timing signal. When charge accumulation in each scan line is completed, the imaging device control unit 205 controls horizontal image signals to be sequentially read. The horizontal image signals are used by the camera control unit 209 during AF detection.

The display 206 displays various images and a variety of information. The display 206 may be an organic light emitting device (OLED) or the like.

Users use the manipulation unit 207 to input various commands in order to manipulate the digital photographing apparatus 1. The manipulation unit 207 may include various buttons, switches, and dials, such as a shutter release button, a main switch SM, a mode dial, a menu button, etc. In FIG. 1, S1 represents the half-pressing operation of the shutter release button, S2 represents the full-pressing operation of the shutter release button, and SM represents a main switch.

The camera control unit 209 performs AF detection with respect to the image signal generated by the imaging device 204 in order to calculate an AF evaluation value. In addition, the camera control unit 209 stores an AF evaluation value obtained at every AF detection time depending on the timing signal generated by the imaging device control unit 205, and calculates a focusing position by using lens position information received from the lens 100 and the stored AF evaluation value. A result of the calculation of the focusing position is transmitted to the lens 100.

The camera mount 208 includes the aforementioned camera-side communication pin.

Schematic operations of the lens 100 and the body unit 200 will now be described.

When a subject is photographed, the main switch SM included in the manipulation unit 207 is manipulated to start an operation of the digital photographing apparatus 1. The digital photographing apparatus 1 performs a live view display as follows.

Image light of the subject, which has passed through the image-forming optical system 101, is incident upon the imaging device 204. At this time, the shutter 203 is in an open state. The incident image light of the subject is converted into an electrical signal in the imaging device 204, and thus an image signal for the subject is generated. The imaging device 204 operates according to the timing signal generated by the imaging device control unit 205. The image signal for the subject is converted into displayable data in the camera control unit 209, and the displayable data is output to the viewfinder 201 and the display 206. This process is referred to as a live view display. During the live view display, live view images are consecutively displayed as a moving picture.

After the live view display is performed, when the shutter release button included in the manipulation unit 207, is half pressed (S1), the digital photographing apparatus 1 starts an AF operation. The AF operation is performed using the image signal generated by the imaging device 204. In a contrast AF method, a focusing position is calculated from an AF evaluation value associated with a contrast value, and the lens 100 is driven based on a result of the calculation. The AF evaluation value is calculated by the camera control unit 209. The camera control unit 209 calculates information used to control the focus lens 104 from the AF evaluation value and transmits the information to the lens control unit 110 via the lens-side and camera-side communication pins included in the lens mount 109 and the camera mount 208.

The lens control unit 110 controls the lens driving actuator 105 to drive the focus lens 104 along the optical axis, on the basis of the received information, thereby performing an AF operation. The position of the focus lens 104 is monitored by the focus lens position detecting sensor 106 so that feedback control is achieved.

When the focal length of the zoom lens 102 has been varied by manipulation by a user, the position of the zoom lens 102 is detected by the zoom lens position detecting sensor 103, and the lens control unit 110 performs the AF operation again by changing AF control parameters of the focus lens 104. The AF control parameters are stored as unique information about the lens 100 in the lens memory 112. When the position of a zoom lens group is changed, conversion coefficients of a focus lens driving amount and a focus deviation amount of a photographing lens are changed. The AF control parameters include the changed conversion coefficients of the focus lens driving amount and the focus deviation amount of the photographing lens.

When a subject image is in-focus by the above-described operation, the shutter release button is fully pressed (S2) after a half-pressing operation (S1), and thus the digital photographing apparatus 1 performs an exposure operation. At this time, the camera control unit 209 completely closes the shutter 203 and transmits all obtained measured-light information as iris control information to the lens control unit 110. The lens control unit 110 controls the iris driving actuator 108 on the basis of the iris control information and tightens the iris 107 with a suitable iris value. The camera control unit 209 controls the shutter 203 on the basis of the measured-light information and opens the imaging device 204 by a suitable exposure time to capture the subject image. In a moving picture mode, the digital photographing apparatus 1 records a moving picture by full-pressing the shutter release button one time, and the recording is concluded when the shutter release button is fully pressed again.

The captured subject image undergoes image signal processing and compression and is stored in a memory card 212 (see FIG. 2). Simultaneously, the captured subject image is output to the viewfinder 201 and the display 206, both of which display the subject. This captured subject image is referred to as a quick view image. Examples of the display 206 include an OLED. A series of photographing operations are completed according to the above-described process.

Moving pictures are captured and simultaneously undergo a moving picture compression process and are stored in the memory card 212 (see FIG. 2). During moving picture photography, live view display instead of quick view display is performed.

A still picture mode and a moving picture mode may be changed using the manipulation unit 207. At the half-pressing operation S1, both the still picture mode and the moving picture mode perform the same function. At the full-pressing operation S2, a still picture is captured in the still picture mode and moving picture recording starts in the moving picture mode.

Structure and Operation of Camera Control Unit

FIG. 2 is a block diagram of the camera control unit 209 included in the digital photographing apparatus according to the embodiment illustrated in FIG. 1.

Referring to FIG. 2, the camera control unit 209 according to the present embodiment may include a pre-processor 220, a signal processor 221, a signal compression and expansion unit 222, a display controller 223, a central processing unit (CPU) 224, a memory controller 225, an audio controller 226, a card controller 227, a second timer (not shown), and a main bus 230.

The camera control unit 209 transmits a variety of instructions and data to its components via the main bus 230.

The pre-processor 220 receives the image signal generated by the imaging device 204 and performs Auto White Balance (AWB), Auto Exposure (AE), and Auto Focus (AF) operations. In other words, an AF evaluation value for focus control, an AE evaluation value for exposure control, an AWB evaluation value for white balance control, and the like are calculated. The AF evaluation value may include a horizontal AF evaluation value that represents a horizontal contrast, and a vertical AF evaluation value that represents a vertical contrast. The horizontal AF evaluation value is calculated from a horizontal image signal received directly from the imaging device 204. On the other hand, the vertical AF evaluation value may be calculated from a vertical image signal into which the horizontal image signal is converted after being stored in a memory 210, which will be described later. In other words, the pre-processor 220 may be an example of an AF evaluation value calculation unit.

The signal processor 221 performs a series of image signal processing operations, such as gamma correction, in order to form a live view image or a captured image that is displayable on a display.

The signal compression and expansion unit 222 compresses and expands the image signal on which the image signal processing has been performed. During compression, the image signal is compressed by using a compression format, for example, a JPEG compression format or an H.264 compression format. An image file including image data generated by the compression is transmitted to and stored in the memory card 212.

The display controller 223 controls images to be output to the LCD 202 of the viewfinder 201 or to the display 206.

The CPU 224 controls all component operations. In the digital photographing apparatus 1 of FIG. 1, the CPU 224 communicates with the lens 100.

The memory controller 225 controls the memory 210 for temporarily storing a captured image or data, such as associated information, and the audio controller 226 controls a microphone or speaker 211. The card controller 227 controls the memory card 212 for storing the captured image.

The operation of the camera control unit 209 will now be briefly described.

When the CPU 224 detects that the main switch SM (see FIG. 1) of the manipulation unit 207 has been manipulated, the CPU 224 operates the imaging device control unit 205 via the pre-processor 220. The imaging device control unit 205 outputs the timing signal to operate the imaging device 204. When the image signal is input from the imaging device 204 to the pre-processor 220, AWB and AE operations are performed. Results of the AWB and AE operations are fed back to the imaging device control unit 205 so that the imaging device 204 may obtain an image signal having suitable color output and suitable exposure.

When the operation of the digital photographing apparatus 1 resumes, live view display is performed. The camera control unit 209 inputs an image signal obtained by a photographing operation under suitable exposure conditions to the pre-processor 220, thereby calculating an AE evaluation value or the like. An image signal for use in live view display is applied directly to the signal processor 221 without passing through the main bus 230, and image signal processing such as pixel interpolation is performed on the received image signal. An image subjected to the image signal processing is displayed on the LCD 202, the display 206, and the like, via the main bus 230 and the display controller 223. The live view display is basically updated at a speed of 60 fps (frames per second), but this should not be construed as limiting. The live view display may be updated at 30 fps, 120 fps, or the like. The update speed may be set by the CPU 224 on the basis of a light measurement result, AF conditions, or the like, and the update speed may be changed according to a timing signal in the imaging device control unit 205.

Figure 8:
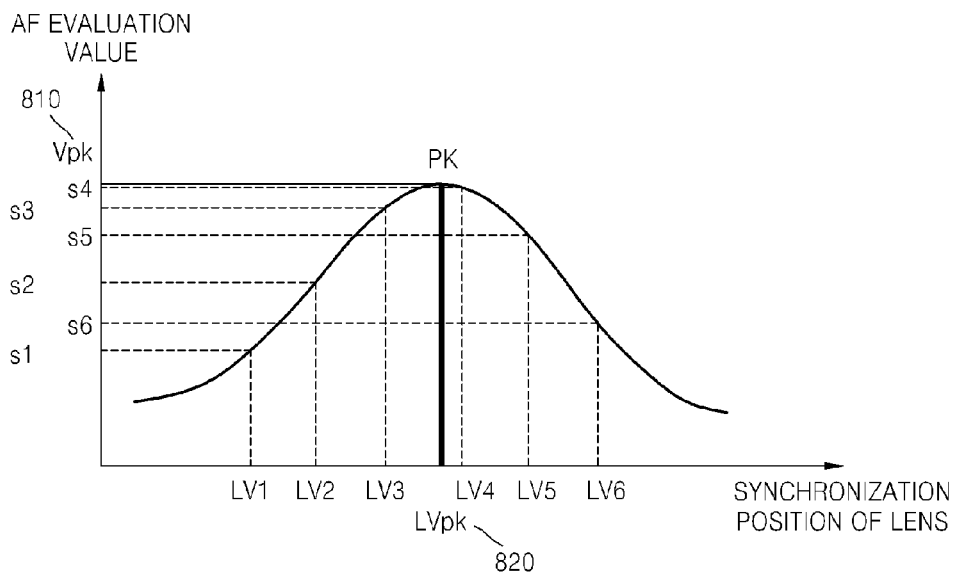
FIG. 8 is an exemplary graph for describing detection of a peak value of AF evaluation values in a contrast AF method.

When the shutter release button is half pressed (S1), the CPU 224 detects an input of a signal out of the half-pressing operation S1 and instructs the lens control unit 110 to start driving the focus lens 104 for an AF operation, via the camera-side and lens-side communication pins included in the camera mount 208 and the lens mount 109. In another embodiment, when the CPU 224 detects the input of the signal out of the half-pressing operation S1, the CPU 224 may directly control the focus lens 104 to be driven in order to perform an AF operation. In other words, the CPU 224 may be an example of a main control unit. An AF output according to the degree to which the focus lens 104 is changed is shown in FIG. 8, and a detailed description thereof will be described later with reference to FIG. 8.

The CPU 224 acquires the image signal from the imaging device 204, and the pre-processor 220 calculates the AF evaluation value of the image signal. The AF evaluation value is calculated according to the motion of the focus lens 104. A position (a position where the AF evaluation value is at a maximum) of the focus lens 104 is calculated from a change in the AF evaluation value, and the focus lens 104 is moved to the calculated position. This series of operations performed by the CPU 224 constitute an AF operation, and a live view image is continuously displayed even during the AF operation. An image signal used to form a live view image is the same as an image signal used to calculate an AF evaluation value.

In the digital photographing apparatus 1 using the lens 100 illustrated in FIG. 1, during an AF operation, the lens 100 communicates with the body unit 200 via the camera-side and lens-side communication pins installed in the camera mount 208 and the lens mount 109, and the camera-side and lens-side communication pins operate through serial communication in order to transmit lens information or control information. Position information about the focus lens 104, corresponding to an AF evaluation value, is also transmitted.

When the shutter release button is fully pressed (S2), the AF operation is stopped in the still picture mode, but the AF operation continues in the moving picture mode. Thus, the AF operation is consecutively repeated even after the digital photographing apparatus 1 is in-focus. In other words, continuous AF is used in the moving picture mode. A continuous AF mode denotes a mode in which a digital photographing apparatus continuously adjusts focus even when the S1 operation has not been performed. However, in the continuous AF mode, the focus lens 104 operates slowly in order to minimize its influence, in terms of sounds or a change in a viewing angle, upon moving picture photographing.

An AF region of which an AF evaluation value is calculated during an AF operation will now be described with reference to FIGS. 3A and 3B.

Multi-AF (Detection of Main Subject)

Figure 3A:
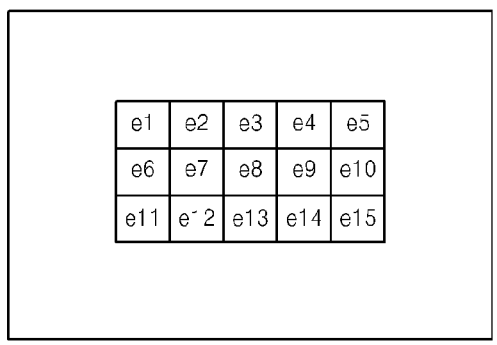
FIG. 3A illustrates a multi-autofocusing (AF) region, namely, an example of a focus detection region in which focus detection is performed during still picture photographing.

FIG. 3A illustrates a multi-AF region, namely, an example of a focus detection region in which focus detection is performed during still picture photographing. The multi-AF region includes multi-AF points (hereafter, referred to as multi-points) e1 through e15. Multi-AF may determine a focus state at each of a plurality of focus detection zones, for example multi-points e1 through e15. In an embodiment, the multi-points e1 through e15 are arranged symmetrically in all directions at the center of a photograph screen as illustrated in FIG. 3A. A multi-point e8 from among the 15 multi-points e1 through e15 is referred to as a central multi-point. According to a setting criterion of the multi-AF region, two central upper and lower regions or two central right and left regions, such as the multi-points e8 and e3 or the multi-points e8 and e9, may be defined as the central multi-point.

Figure 3B:
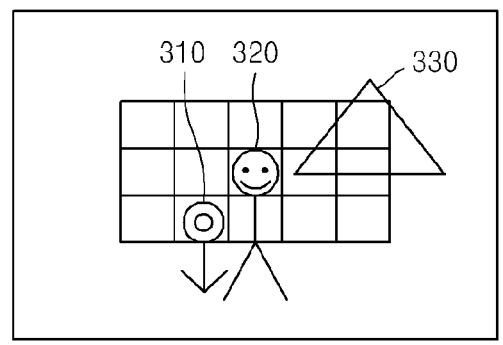
FIG. 3B illustrates an example in which subjects exist within the multi-AF region illustrated in FIG. 3A.

FIG. 3B illustrates an example in which subjects exist within the multi-AF region illustrated in FIG. 3A.

In FIG. 3B, a flower 310 is located at a position nearest to a photographer, and a person 320 and a mountain 330 are sequentially located behind the flower 310. Referring to FIGS. 3A and 3B, the flower 310 is located in the multi-point e12, the person 320 is located in the multi-point e8, and the mountain 330 ranges over the multi-points e4, e5, e9, and e10.

In a digital photographing apparatus based on a contrast AF method, photographing is performed with priority only on a subject at close range. Referring to FIG. 3B, the flower 310 is closest to the photographer, and thus the multi-point e12 is brought into focus.

However, if the person 320 is intended as a main subject of the image of FIG. 3B, photographing needs to be performed with priority on the central subject in the multi-point e8. Thus, even when the contrast AF method is used, a multi-AF method which selectively focuses on the nearest subject or on the central subject by measuring distances at multi-points is needed.

Figure 4A:
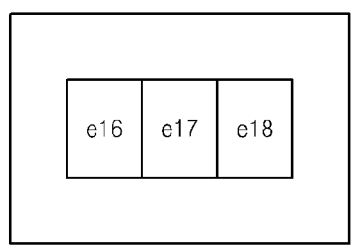
FIGS. 4A and 4B illustrate a multi-AF region, namely, an example of a focus detection region in which focus detection is performed during moving picture photographing.
Figure 4B:
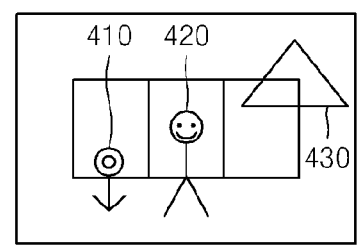
Figure 5:
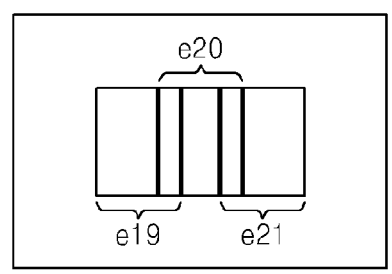
FIG. 5 illustrates an exemplary multi-AF region in which regions partially overlap one another.

FIGS. 4A and 4B illustrate a multi-AF region, namely, an example of a focus detection region in which focus detection is performed during moving picture photographing. FIG. 5 illustrates an exemplary multi-AF region in which regions (multi-points e19, e20, and e21) partially overlap one another.

In an embodiment, three multi-points e16, e17, and e18 are arranged symmetrically as a multi-AF region about the center of a photograph screen as illustrated in FIG. 4A.

FIG. 4B illustrates an example in which subjects exist in the multi-AF region illustrated in FIG. 4A. In FIG. 4B, a flower 410 is located at a position closest to a photographer, and a person 420 and a mountain 430 are sequentially located behind the flower 410.

As in FIGS. 3A and 3B, in this case, when a digital photographing apparatus uses an existing contrast AF method, a subject closest to a photographer is selected as the AF target. Thus, the flower 410, that is, the multi-point e16, of FIG. 4B is brought into focus.

Therefore, a digital photographing apparatus using an existing contrast AF method needs to apply a new multi-AF function further providing central point priority along with nearest point priority to focus on the person 420, that is, the multi-point e17.

FIG. 6 illustrates a table for explaining a near and central mixed focus selection method conventionally used in a phase difference AF method. In the phase difference AF method, the focus lens 104 is adjusted to focus on the nearest subject or the central subject according to magnification.

In the phase difference AF method, the focus lens 104 is in a pause state, and thus a defocus amount may be previously detected. On the other hand, in the contrast AF method, the position of the focus lens 104 may only be detected by adjusting the focus lens 104. Thus, a method different from the phase difference AF method is required for the contrast AF method to be able to use the central multi-point focus selection method along with the nearest multi-point focus selection method.

FIGS. 7A and 7B illustrate an exemplary multi-AF method that adaptively uses the nearest multi-point focus selection method or the central multi-point focus selection method.

Referring to FIGS. 7A and 7B, the multi-AF method may be divided into two types according to patterns of distances between subjects existing in the multi-AF region. FIG. 7A illustrates application of the multi-AF method in a case where a subject located in a central multi-point of the multi-AF region is the farthest from a photographer. FIG. 7B illustrates application of the multi-AF methods in cases other than the case of FIG. 7A.

In FIGS. 7A and 7B, $\beta$ denotes an image magnification of the subject. The image magnification is a function between a focal distance of the zoom lens 102 and a subject distance, and is defined as a ratio of a distance between the front surface of a lens and a subject to a distance between the rear surface of the lens and the subject. The focal distance of the zoom lens 102 and the position of the focus lens 104 may be ascertained from the output values of the zoom lens position detecting sensor 103 and the focus lens position detecting sensor 106, respectively.

In the graphs of FIGS. 7A and 7B, $\beta_m$ on the x axis indicates an image magnification of a center region. The center region denotes a central multi-point of the 15 multi-points illustrated in FIGS. 3A and 3B. In the graphs of FIGS. 7A and 7B, $\beta_{near}$ on the y axis indicates an image magnification of a subject nearest to a photographer. The image magnification increases the closer to the origin. The image magnification decreases the farther from the origin.

$\beta_{near}$ may include $\beta_m$, but $\beta_m$ may not include $\beta_{near}$. Thus, there is no case where a subject is selected, as indicated in FIGS. 7A and 7B by a region 710 above a region where $\beta_m = \beta_{near}$.

As in the embodiment of FIG. 7A, if the central multi-point is the farthest point from a photographer by measuring distances at multi-points, it is determined whether $\beta_{near}$ is equal to or greater than a magnification of 1/15. If $\beta_{near}$ is greater than the magnification of 1/15, current photographing is determined to be macro photographing, and the focus is adjusted on the central multi-point. On the other hand, if $\beta_{near}$ is less than the magnification of 1/15, the focus is adjusted on the nearest multi-point by measuring distances at multi-points.

As in the embodiment of FIG. 7B, in the cases other than the case where the central multi-point is the farthest from the photographer, both the nearest multi-point focus selection method and the central multi-point focus selection method may be used as follows.

When $\beta_{near}$ is greater than the magnification of 1/15, the photographing is determined to be macro photographing, and thus the focus is adjusted on the central multi-point.

When $\beta_{near}$ is less than the magnification of 1/15, two types of selections may be made.

First, when $\beta_m$ is less than the magnification of 1/15 and greater than a magnification of 1/60, the focus is adjusted on the central multi-point. Next, when $\beta_m$ is less than the magnification of 1/60, the focus is adjusted on the nearest multi-point in which the subject is the closest from a photographer by measuring distances at multi-points.

FIG. 3B corresponds to the case of FIG. 7B, where the center multi-point is not farthest from the subject. Thus, when $\beta_{near}$ is greater than the magnification of 1/15, the focus is adjusted on the central multi-point e8 of FIG. 3B. Even when $\beta_m$ is less than the magnification of 1/15 and greater than the magnification of 1/60, the focus is adjusted on the central multi-point e8. When $\beta_m$ is less than the magnification of 1/60, the focus is adjusted on the multi-point e12 where the subject nearest to the photographer exists.

FIGS. 7A and 7B illustrate ratios 1/15 and 1/60, which are set as bases for selecting the central multi-point and the nearest multi-point in the case where a digital photographing apparatus is used horizontally to perform photographing. Thus, in a case where a digital photographing apparatus is used vertically to perform photographing, the bases for selecting the central multi-point and the nearest multi-point may be different from the ratios 1/15 and 1/60. In a case where two central multi-points are selected, a magnification $\beta_u$ of a region directly over the central multi-point may be further used during macro photographing.

The magnifications 1/15 and 1/60 when the multi-AF method of FIGS. 7A and 7B is implemented in the contrast AF are only an embodiment, and may be changed or replaced by other magnifications by one of ordinary skill in the art to which the present embodiment pertains. Also, the magnifications ¹/₁₅ and ¹/₆₀ may be changed in a method of magnifying a central multi-point, or the base for selecting the central multi-point and the nearest multi-point may be more finely divided than the magnification ¹/₁₅ so that the central multi-point and the nearest multi-point may be selected together. A method of applying a multi-AF method using the contrast AF, according to an embodiment, will be described later with reference to FIGS. 12 through 22.

FIG. 8 is an exemplary graph for describing detection of a peak value of AF evaluation values in a contrast AF method. FIG. 8 shows the relationship between the AF evaluation value and the position of the focus lens in the contrast AF method. In FIG. 8, the horizontal axis indicates lens synchronization positions (focusing positions corresponding to intermediate points of time of AF detection), and the vertical axis indicates the AF evaluation values. The AF evaluation values and focusing positions corresponding to the AF evaluation values are stored in the lens memory 112.

In the contrast AF method, a lens synchronization position $LV_{pk}$ 820 corresponding to a peak value $V_{pk}$ 810 of the AF evaluation values is detected in order to find a region on which the focus lens 104 is to be focused.

In FIG. 8, the actual peak position of the lens is $LV_{pk}$ 820 where the evaluation value takes a maximum value $V_{pk}$ 810. The AF evaluation values, however, are discrete, and thus an actual peak value may be calculated by interpolating the AF evaluation values. The interpolation for detecting the peak value $V_{pk}$ 810 may be performed using lens synchronization positions LV3, LV4, and LV5 and three data, namely, AF evaluation values L(s3), L(s4), and L(s5) corresponding to the lens synchronization positions LV3, LV4, and LV5.

Central points of charge accumulation periods of the AF evaluation values, namely, detection central positions LV1, LV2, LV3, etc., are set to be lens synchronization positions. Information about the lens synchronization positions may be obtained from the lens 100 of FIG. 1. The information about the lens synchronization positions stored in the lens 100 may be ascertained at the timing corresponding to the lens synchronization positions LV1, LV2, LV3, etc.

The focus lens 104 may be moved to an in-focus position by detecting the positions of the lens at the timings synchronized with the detection central positions.

Figure 9:
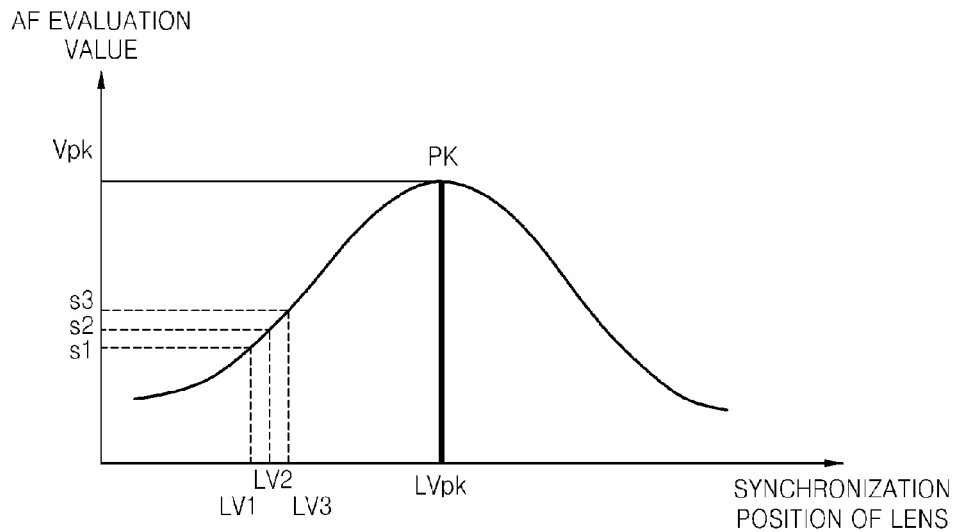
FIG. 9 illustrates an example of a method of determining a range of potential peak (RPP)

FIG. 9 illustrates an example of a method of determining a range of potential peak (hereinafter, RPP). The RPP denotes a range where it is determined whether there is a possibility that a peak of AF evaluation values exists.

FIG. 9 illustrates a method of detecting AF evaluation values before a contrast peak value is found. The AF evaluation values corresponding to the lens synchronization positions LV1, LV2, and LV3 are referred to as s1, s2, s3, respectively. In an embodiment, when an AF evaluation value monotonically increases or decreases, it is determined that a contrast peak exists on the side where the AF evaluation value monotonically increases or decreases.

For example, as illustrated in FIG. 9, when s1<s2<s3, it is determined that a peak value exists on the right side (scanning direction) of the lens synchronization position LV3. This process is referred to as range detection of potential peak. On the other hand, when s1>s2>s3, it is determined that a peak value exists on the left side (direction opposite to the scanning direction) of the lens synchronization position LV1. In this case, the scanning direction may be inverted for range detection. In addition, as the frequency of AF detection for acquiring an AF evaluation value decreases, a RPP may be detected from a point far away from a peak. In general, a RPP may be detected starting from a point several tens of Fδ before a peak.

Here, F indicates a photographing iris value, and δ indicates a permissible circle of uncertainty.

FIGS. 12 through 22 illustrate applications of the multi-AF method illustrated in FIG. 7 in the contrast AF method, according to various embodiments.

In FIGS. 12 through 22, the x axis indicates a lens synchronization position, the y axis indicates an AF evaluation value, ▷ indicates a position where scanning starts, and ○ indicates an in-focus position.

Although AF evaluation values can be acquired from the 15 multi-points of FIGS. 3A and 3B, respectively, FIGS. 12 through 22 display only AF evaluation values for some of the 15 multi-points. In FIGS. 12 through 22, M denotes a peak value of a subject in a central multi-point, $N_0$ denotes a peak value of a nearest subject in a nearest multi-point, N1 denotes a peak value of a first near subject, and F denotes a peak value of a subject relatively far from a photographer from among subjects other than the above-described subjects. Also, $N_z$ and $\infty z$ denote range detection points where it is determined whether peaks can exist after the point $N_z$ and before the point $\infty z$. $N_z$ and $\infty z$ are also used to find out a RPP. The point $N_z$ denotes a range detection point in a Near direction, and the point $\infty z$ denotes a range detection point in a $\infty$ direction. Referring to FIGS. 8 and 9, the Near direction represents the leftward direction along the horizontal axis, and the $\infty$ direction represents the rightward direction along the horizontal axis.

Figure 20:
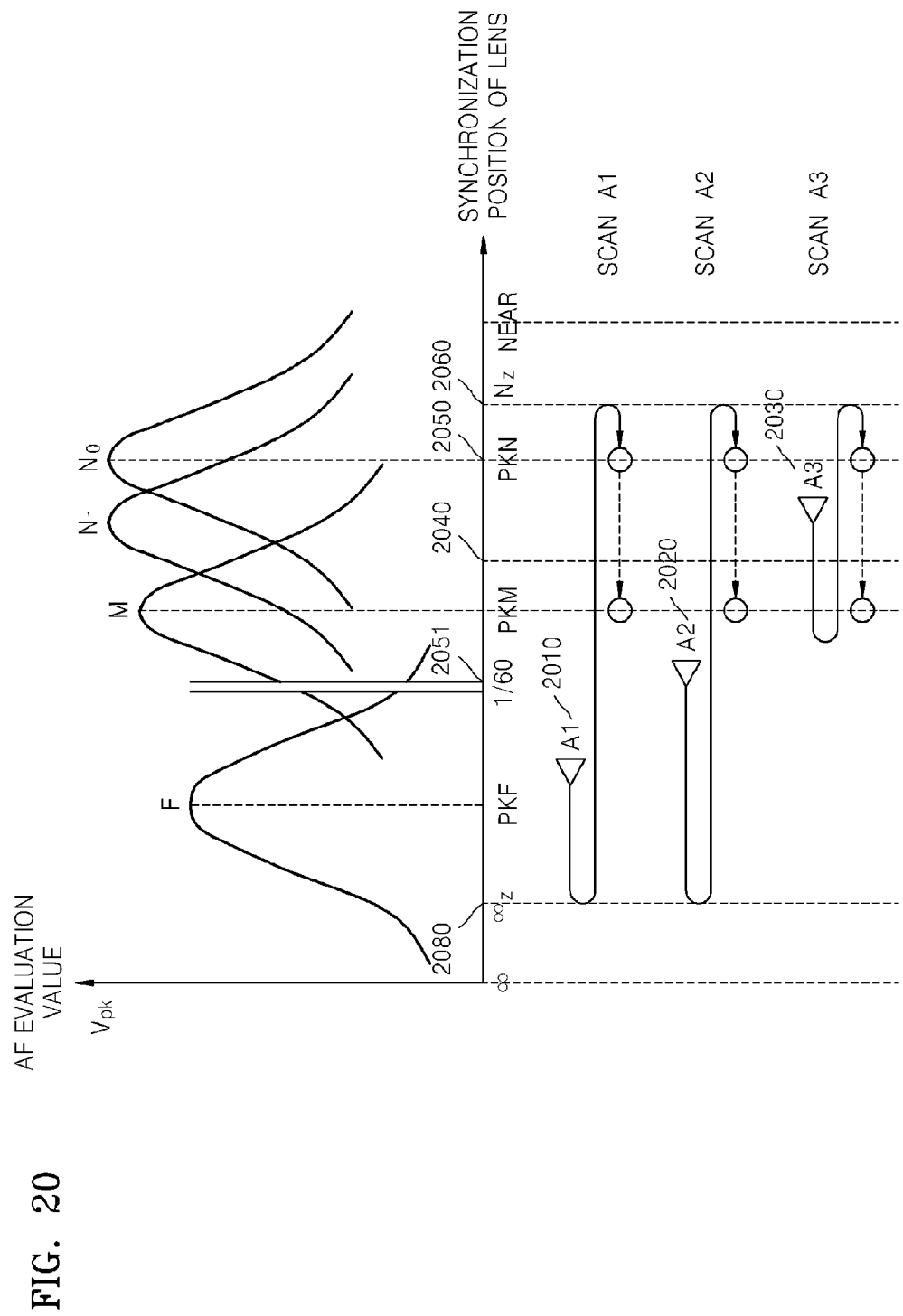
FIG. 20 illustrates an embodiment in which the magnification of the central multi-point is greater than 1/60.
Figure 21:
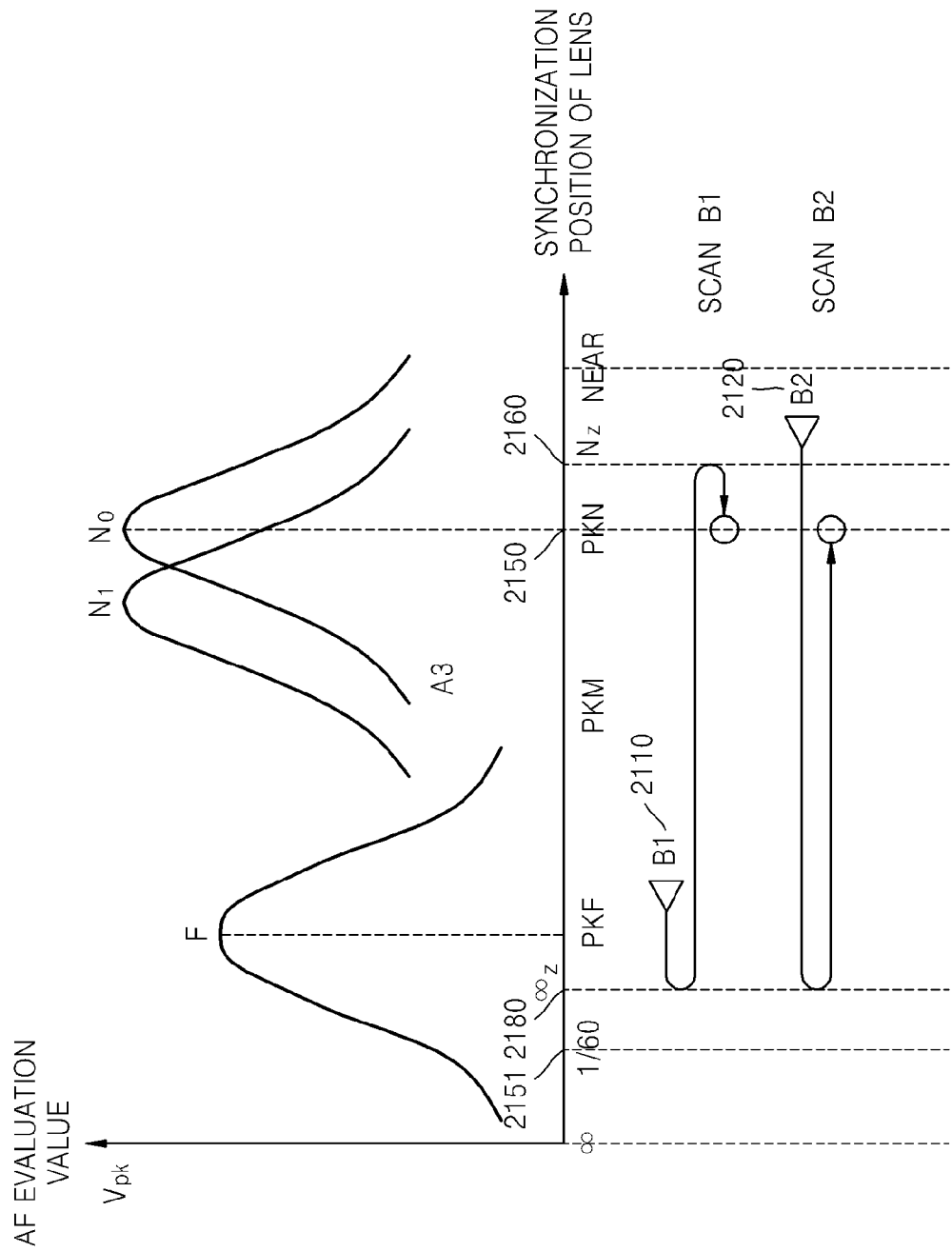
FIG. 21 illustrates application of the multi-AF method illustrated in FIGS. 7A and 7B in the contrast AF method when the contrast of the central multi-point cannot be detected, according to an embodiment.
Figure 22:
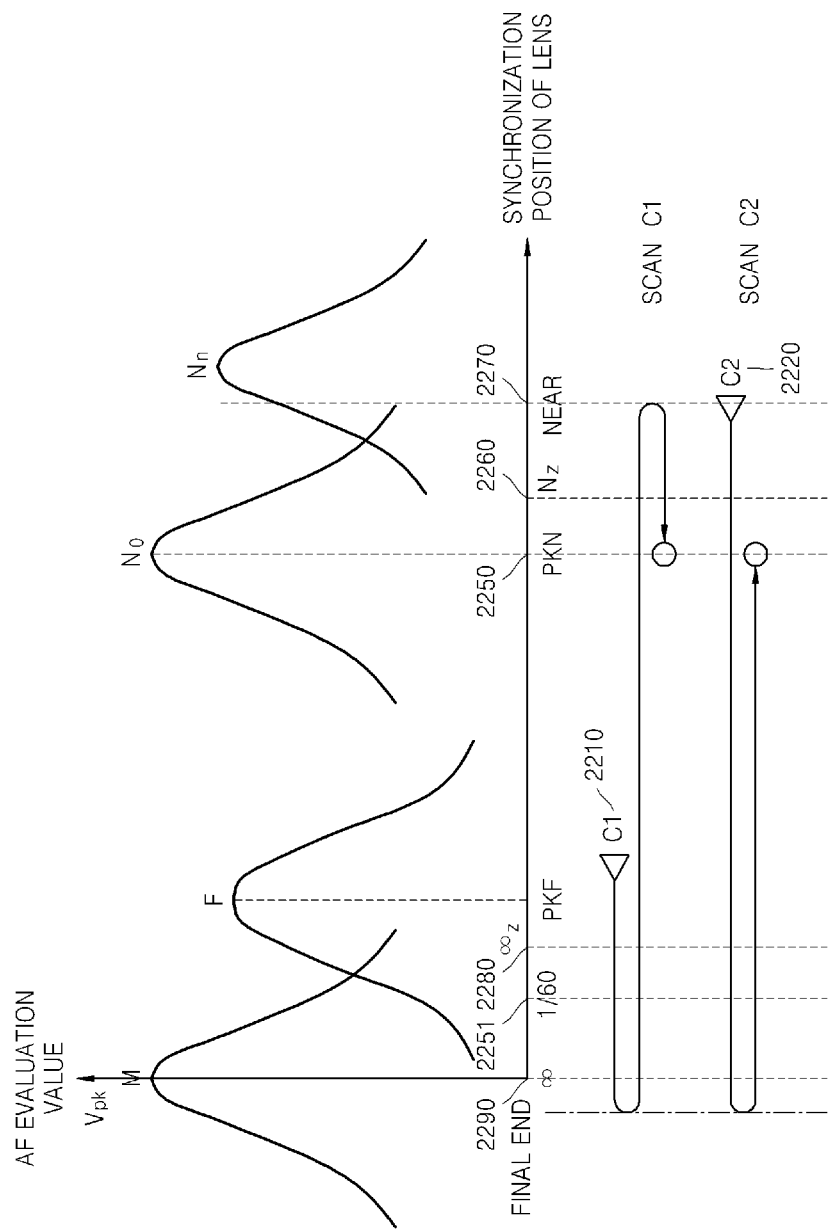
FIG. 22 illustrates an embodiment in which a subject in a near region exists nearer to the photographer than the nearest location detectable by the digital photographing apparatus is and a subject in a central multi-point exists at the location ∞.

FIGS. 12 through 19 illustrate an example of performing scanning in a direction from $\infty$ to Near. FIGS. 20 through 22 illustrate an example of performing scanning in a direction from Near to $\infty$.

Figure 12:
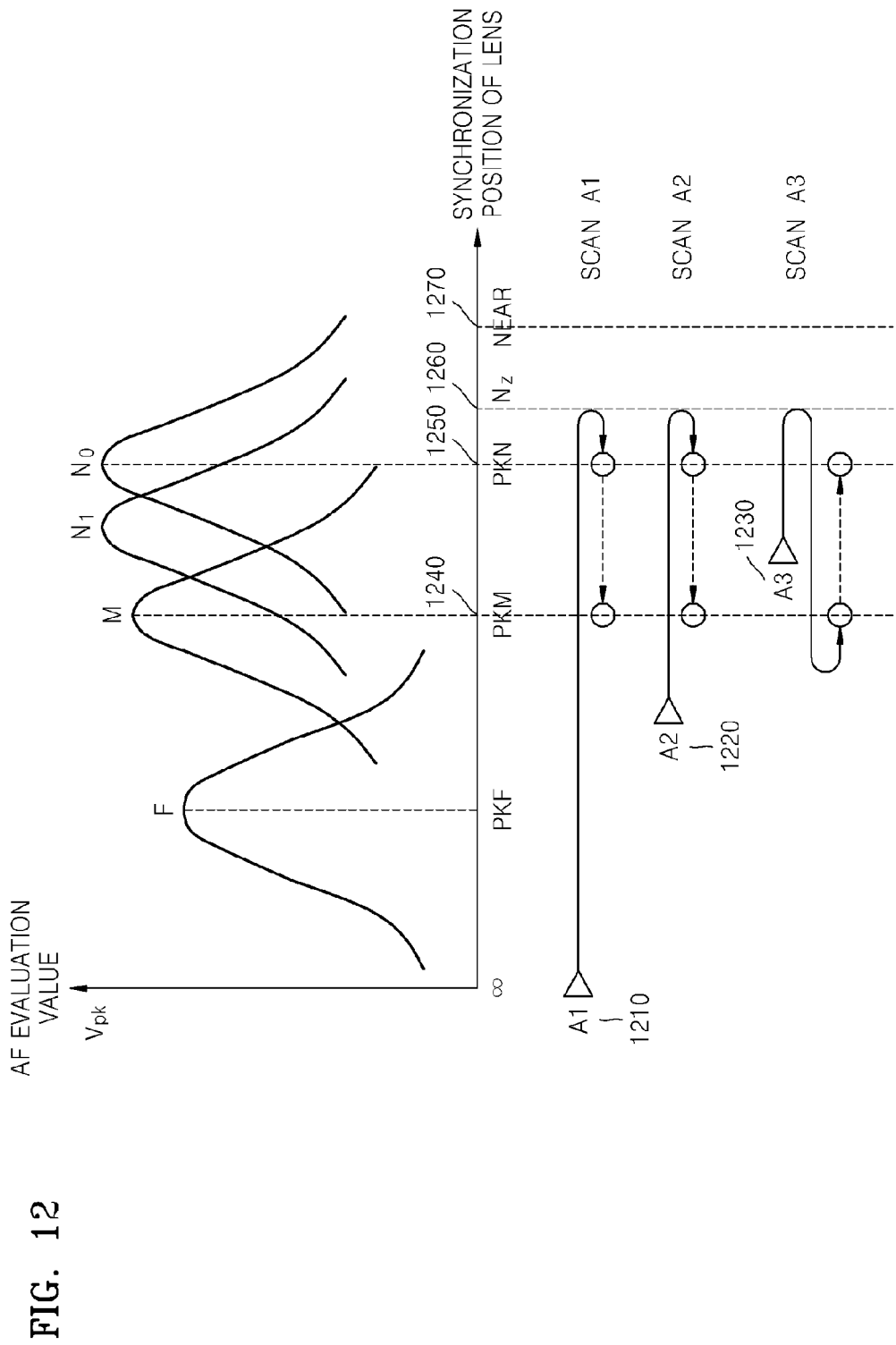
FIG. 12 illustrates application of the multi-AF method illustrated in FIGS. 7A and 7B in the contrast AF method when a central multi-point and a nearest multi-point are both detected, according to an embodiment.

FIG. 12 illustrates application of the multi-AF method illustrated in FIGS. 7A and 7B in the contrast AF method when a central multi-point and a near region are both detected, according to an embodiment. The near region may be associated with the nearest multi-point.

A case A1 where a lens is located at a point $\infty$, a case A2 where the lens is located in a $\infty$ direction from a peak M 1240 of the central multi-point, and a case A3 where the lens is located in a Near direction from the peak M 1240 of the central multi-point are described as follows.

In the case A1, namely, a case 1210, the lens performs scanning from the point $\infty$ to a point $N_z$ 1260, which is the range detection point. Since the AF evaluation value of the subject, which is the peak value $N_0$, monotonically decreases after the point $N_z$ 1260, no peaks exist beyond $N_z$. Thus, scanning is not performed until a nearest point 1270, and the travelling direction of the focus lens is inverted at the point $N_z$ 1260.

In the case A1, while the lens is scanning from the point $\infty$ 1210 to the range detection point $N_z$ 1260, the lens passes through the peak M of the central multi-point and the peak $N_0$ of the nearest multi-point. Thereafter, by applying the multi-AF method at the range detection point $N_z$ 1260, the lens is driven to be focused on the peak M or $N_0$. The multi-AF method refers to FIGS. 7A and 7B. However, the multi-AF method of FIGS. 7A and 7B is only an example, and various changes may be made therein.

Also, in a case A2, while the lens is scanning from a current position 1220 to the range detection point $N_z$ 1260, the peak M of the central multi-point and the peak $N_0$ of the nearest multi-point are both ascertained. Thereafter, by applying the multi-AF method at the range detection point $N_z$ 1260, the lens is driven to be focused on the peak M or $N_0$.

In a case A3, when the lens scans from a current position 1230 to the range detection point $N_z$ 1260, only the peak $N_0$ in the nearest multi-point is detected, that is, the peak M in the central multi-point is not detected. Thus, the scanning direction is inverted to the ∞ direction, and if the peak M in the central multi-point is detected during the scanning in the ∞ direction, the scanning is stopped. Thereafter, the scanning direction is changed at the $PK_M$ point 1240, and the lens is driven to be focused on the peak M or $N_0$ by applying the multi-AF method.

Figure 13:
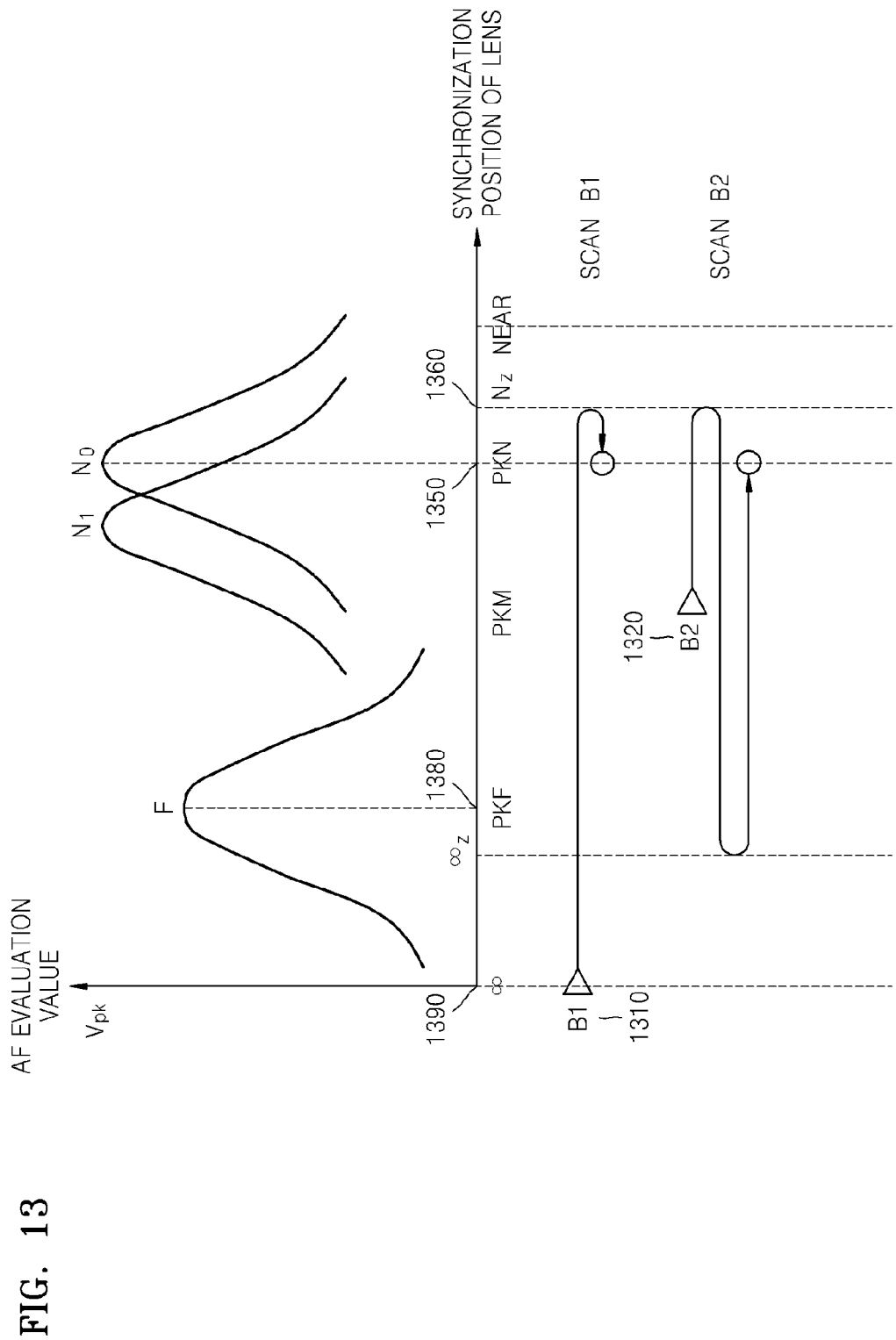
FIG. 13 illustrates application of the multi-AF method illustrated in FIGS. 7A and 7B in the contrast AF method when the central multi-point is not detected because its contrast is low, according to an embodiment.

FIG. 13 illustrates application of the multi-AF method illustrated in FIGS. 7A and 7B in the contrast AF method when the central multi-point M is not detected because its contrast is low, according to an embodiment.

In a case B1 (1310), the lens is moved from the ∞ point 1390 to a range detection point $N_z$ 1360. Since it is determined that no subjects exist in a central multi-point, the lens is driven at the $N_z$ point 1360 and focused on a peak $N_0$ of a nearest subject.

In a case B2 (1320), since the lens is moved from a point 1320 located between the ∞z point and Nz, if it is determined up to the range detection point $N_z$ 1360 that no subjects exist in the central multi-point, the direction of scanning is inverted at the $N_z$ point 1360 and scanning is performed up to the ∞z point 1380 to search for the subject in the central region. Since it is determined according to the scanning that no subjects exist in the central multi-point, the lens is focused on the nearest subject $N_0$.

Figure 14:
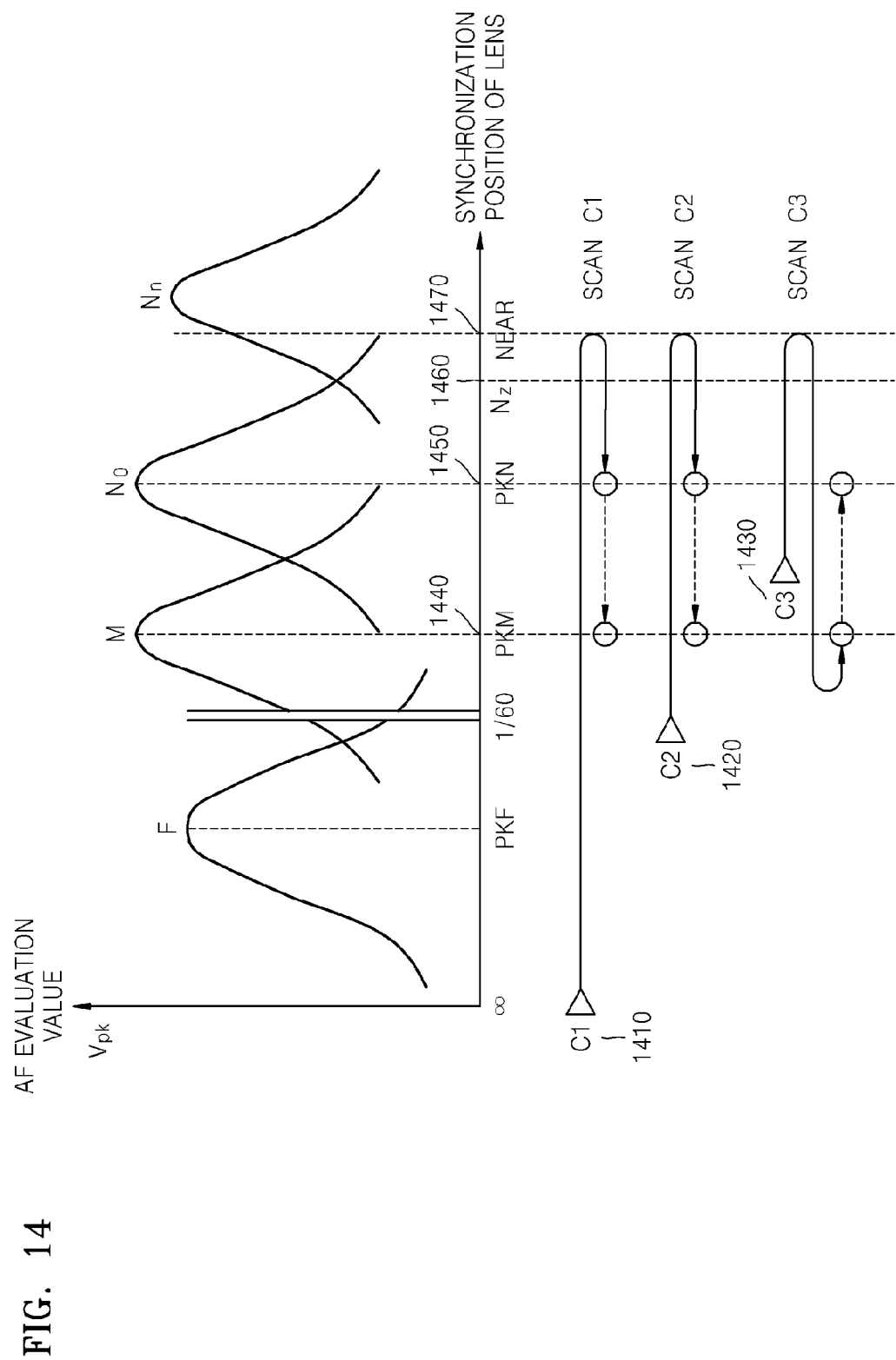
FIG. 14 illustrates application of the multi-AF method illustrated in FIGS. 7A and 7B in the contrast AF method when a subject exists at a location nearer to a digital photographing apparatus than a nearest location detectable by the digital photographing apparatus is and when a magnification of the central multi-point is greater than 1/60, according to an embodiment.

FIG. 14 illustrates application of the multi-AF method illustrated in FIGS. 7A and 7B in the contrast AF method when a subject exists at a location (e.g., an ultra-near region) nearer to a digital photographing apparatus than a nearest location detectable by the digital photographing apparatus and when a magnification of the central multi-point M is greater than 1/60, according to an embodiment. FIG. 14 shows the AF value of the subject corresponding to $N_n$. In many cases, the ultra-near region denotes a case where the subject exists within a photographing distance.

A case C1 where a lens is initially located at a point ∞, a case C2 where the lens is initially located between the ∞ point and a $PK_M$ point 1440 corresponding to a peak M of the central multi-point, and a case C3 where the lens is initially located between the $PK_M$ point 1440 and a point NEAR will now be described.

In the case C1 (1410), scanning is performed from the point ∞ to a range detection point $N_z$ 1460. Since a RPP is detected at the range detection point $N_z$ 1460, the scanning continues up to a final end 1470. Since a graph including the peak $N_n$ monotonically increases at the range detection point $N_z$ 1460, it is determined that a new peak exists on the right side of the range detection point $N_z$ 1460 (in a scanning direction). After up to the final end 1470 is scanned, the lens is focused on the peak M or $N_0$ by applying the multi-AF method. The application of the multi-AF method refers to FIGS. 7A and 7B.

In the case C2 (1420), after an operation similar to the operation in the case C1 is performed, the lens is focused on the peak M or $N_0$ by applying the multi-AF method.

In the case C3 (1430), since a central multi-point is not detected even when up to the final end 1470 is scanned, the direction of scanning is inverted at the final end 1470 and is performed to detect the peak M of the central multi-point. After the peak M of the central multi-point is detected, the direction of scanning is inverted, and the lens is focused on the peak M or $N_0$.

Figure 15:
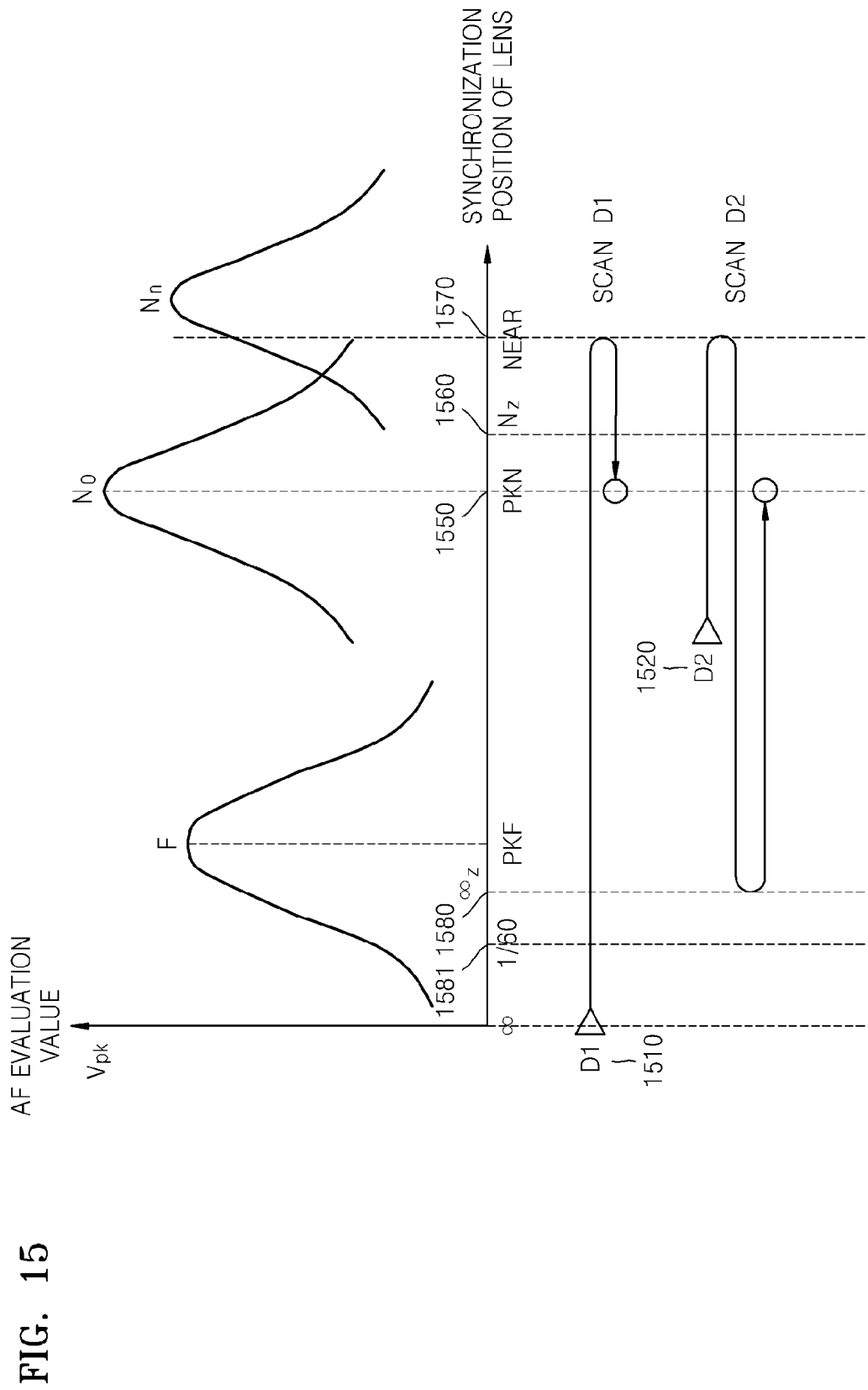
FIG. 15 illustrates application of the multi-AF method illustrated in FIGS. 7A and 7B in the contrast AF method when the central multi-point fails to be detected and a subject existing in the near region is nearer to the photographer than the nearest location detectable by the digital photographing apparatus, according to an embodiment.

FIG. 15 illustrates application of the multi-AF method illustrated in FIGS. 7A and 7B in the contrast AF method when the central multi-point M fails to be detected and a subject existing in the near region is nearer to a photographer than the nearest location detectable by the digital photographing apparatus, according to an embodiment.

In a case D1 (1510), scanning is performed from a point ∞ to a range detection point $N_z$ 1560. Since a RPP region is detected at the range detection point $N_z$ 1560, up to a final end 1570 is scanned. Since the central multi-point is not detected because its contrast is low, the lens is focused on a peak $N_0$ of the near region.

In a case D2 (1520), after scanning is performed up to the final end 1570, the direction of scanning is inverted and continues up to the range detection point ∞z. Then, the direction of scanning is inverted again, and the lens is focused on the peak $N_0$.

Figure 16:
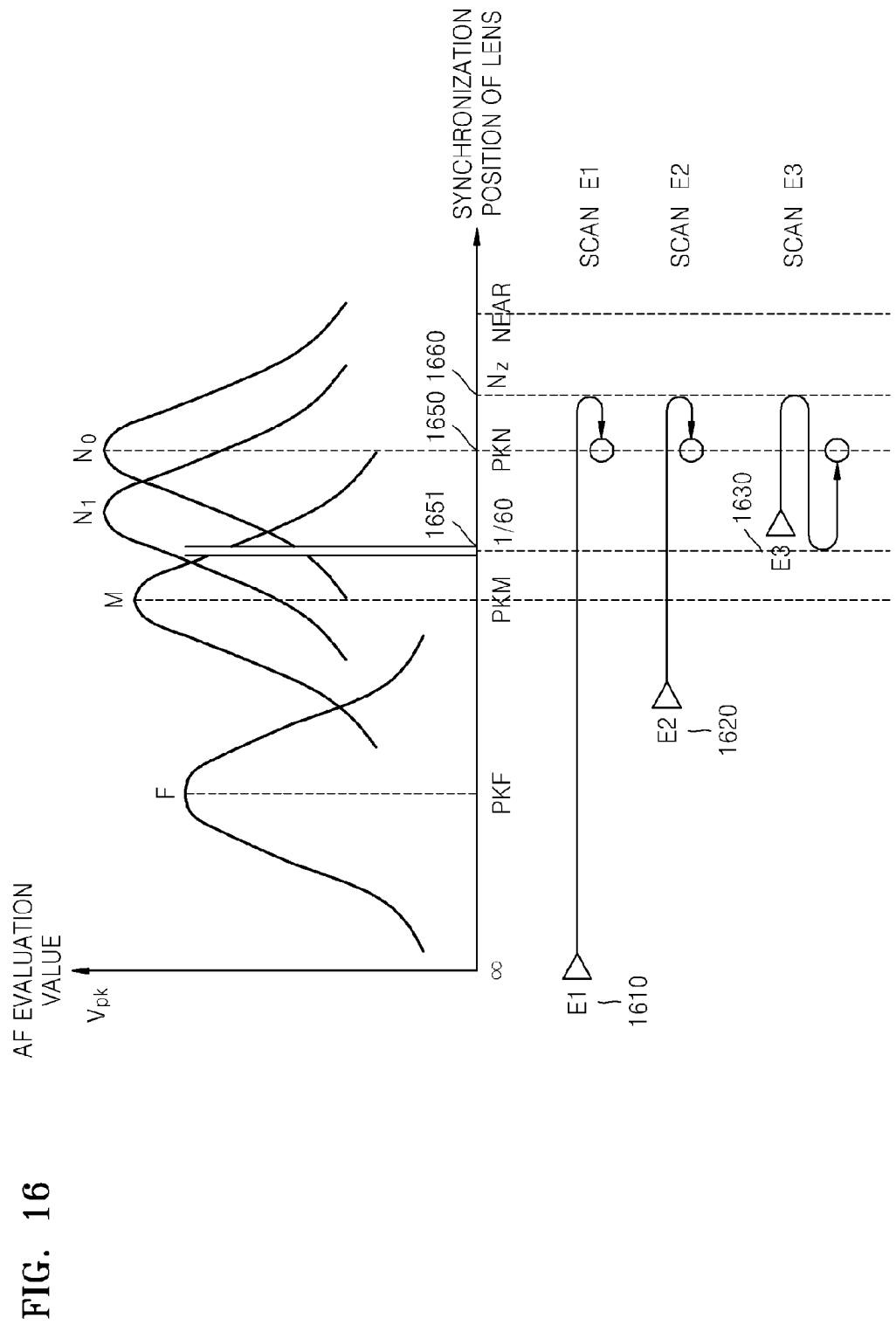
FIG. 16 illustrates application of the multi-AF method illustrated in FIGS. 7A and 7B in the contrast AF method when a magnification of a subject of the central multi-point is less than 1/60, according to an embodiment of the present invention.

FIG. 16 illustrates application of the multi-AF method illustrated in FIGS. 7A and 7B in the contrast AF method when the magnification of a subject in the central multi-point M is less than 1/60, according to an embodiment. When the magnification of the subject in the central multi-point M is less than 1/60, the lens is always focused on a near region when referring to FIGS. 7A and 7B. Thus, in cases E1 (1610) and E2 (1620), immediately after scanning is performed, the lens is focused on a peak $N_0$. In a case E3 (1630), after up to a range detection point $N_z$ 1660 is scanned, the direction of scanning is inverted and continues until the point 1/60. If a central multi-point is not detected during the scanning up to the point 1/60, the lens is focused on the peak $N_0$. In this case, a region less than the point 1/60 does not need to be scanned.

Figure 17:
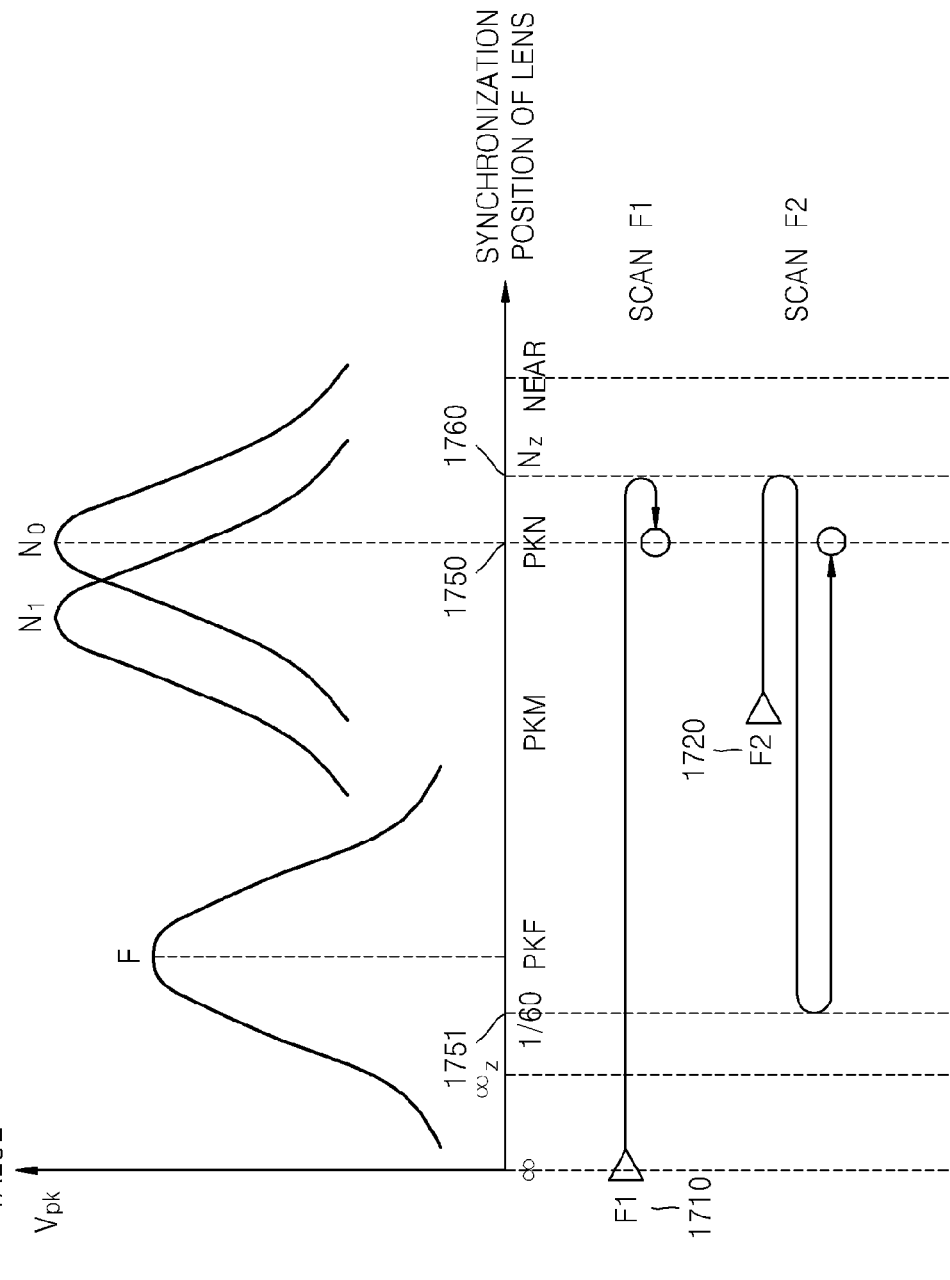
FIG. 17 illustrates application of the multi-AF method illustrated in FIGS. 7A and 7B in the contrast AF method when the central multi-point is not detected because its contrast is low, and when a range detection point ∞z is closer to ∞ than the point 1/60 is, according to an embodiment.

FIG. 17 illustrates application of the multi-AF method illustrated in FIGS. 7A and 7B in the contrast AF method when the central multi-point M is not detected because its contrast is low, and when a range detection point ∞z is closer to ∞ than the point 1/60 1751 is, according to an embodiment.

In a case F1 (1710), after up to a range detection point $N_z$ 1760 is scanned, the direction of scanning is inverted, and the lens is focused on a peak $N_0$. In a case F2 (1720), after up to the range detection point $N_z$ 1760 is scanned, the direction of scanning is inverted and continues up to a point 1/60 1751. Although a central multi-point is detected in a position range lower than the point 1/60 1751, the lens is focused on a near region when the multi-AF method is used (see FIGS. 7A and 7B). Thus, only up to the point 1/60 1751 is scanned, the direction of scanning is inverted, and the lens is focused on the peak $N_0$.

Figure 18:
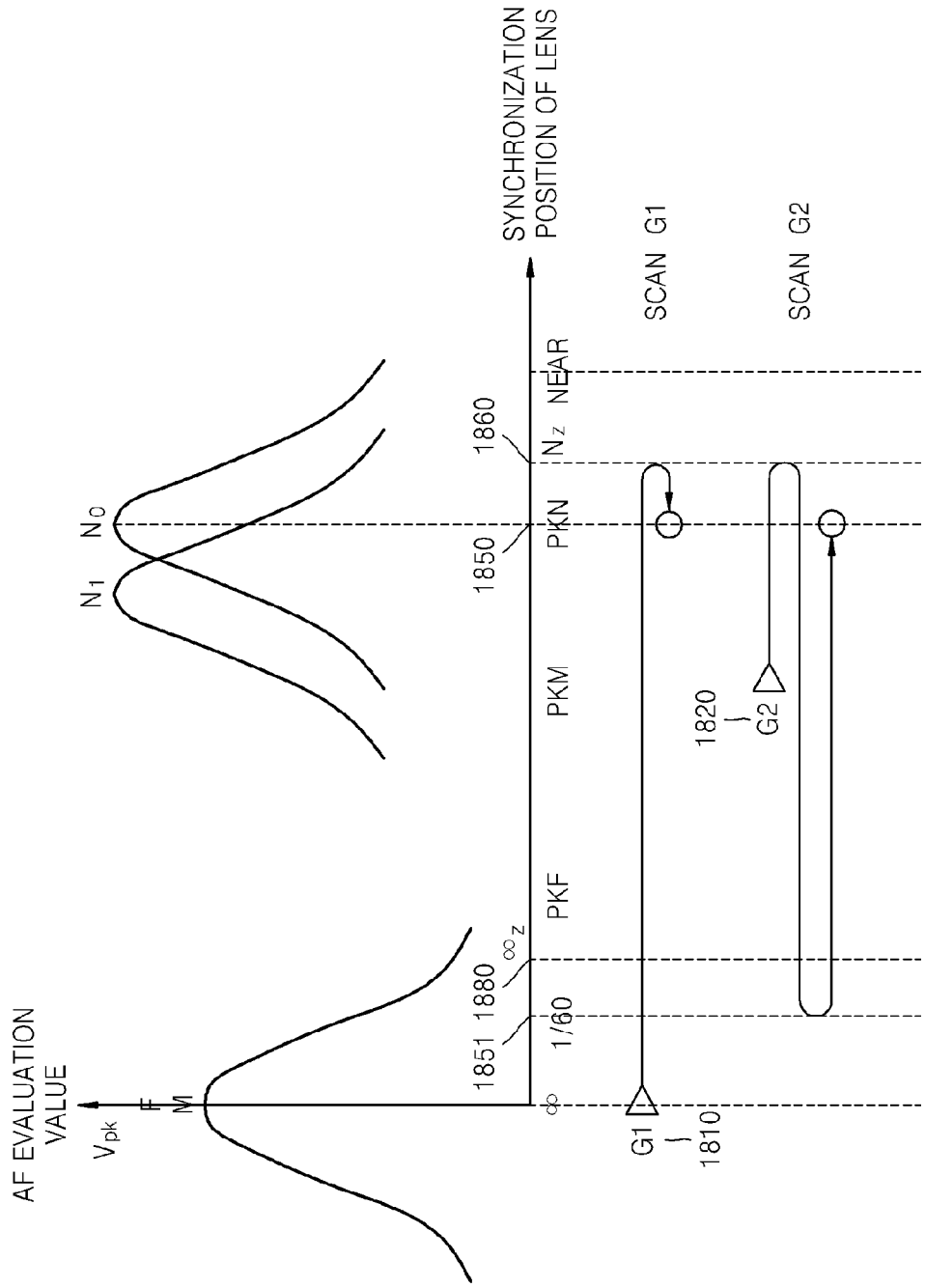
FIG. 18 illustrates application of the multi-AF method illustrated in FIGS. 7A and 7B in the contrast AF method when a subject in the central multi-point is detected at a location ∞ and the point 1/60 is closer to ∞ than the range detection point ∞z is, according to an embodiment.

FIG. 18 illustrates application of the multi-AF method illustrated in FIGS. 7A and 7B in the contrast AF method when a subject in the central multi-point is detected at a location ∞ and a point 1/60 1851 is closer to ∞ than a range detection point ∞z 1880 is, according to an embodiment.

In a case G1 (1810), after scanning is performed from a ∞ point to a range detection point $N_z$ 1860, the direction of scanning is inverted, and the lens is focused on a peak $N_0$. This is because the central multi-point M has been detected during the scanning from the ∞ point to the range detection point ∞.

In a case G2 (1820), after scanning is performed up to the range detection point Nz 1860, the direction of scanning is inverted and continues. Thereafter, a RPP is detected at a range detection point ∞z 1880, and thus the scanning is performed toward the ∞ point and continues up to the point 1/60. Since a central multi-point is not detected even when up to the point 1/60 is scanned, the direction of scanning is inverted again, and the lens is focused on the peak $N_0$. In this case, due to a determination that a difference in an AF time between the range detection point ∞z 1880 and the point 1/60 1851 is little, the inversion of the scanning direction may be omitted.

Figure 19:
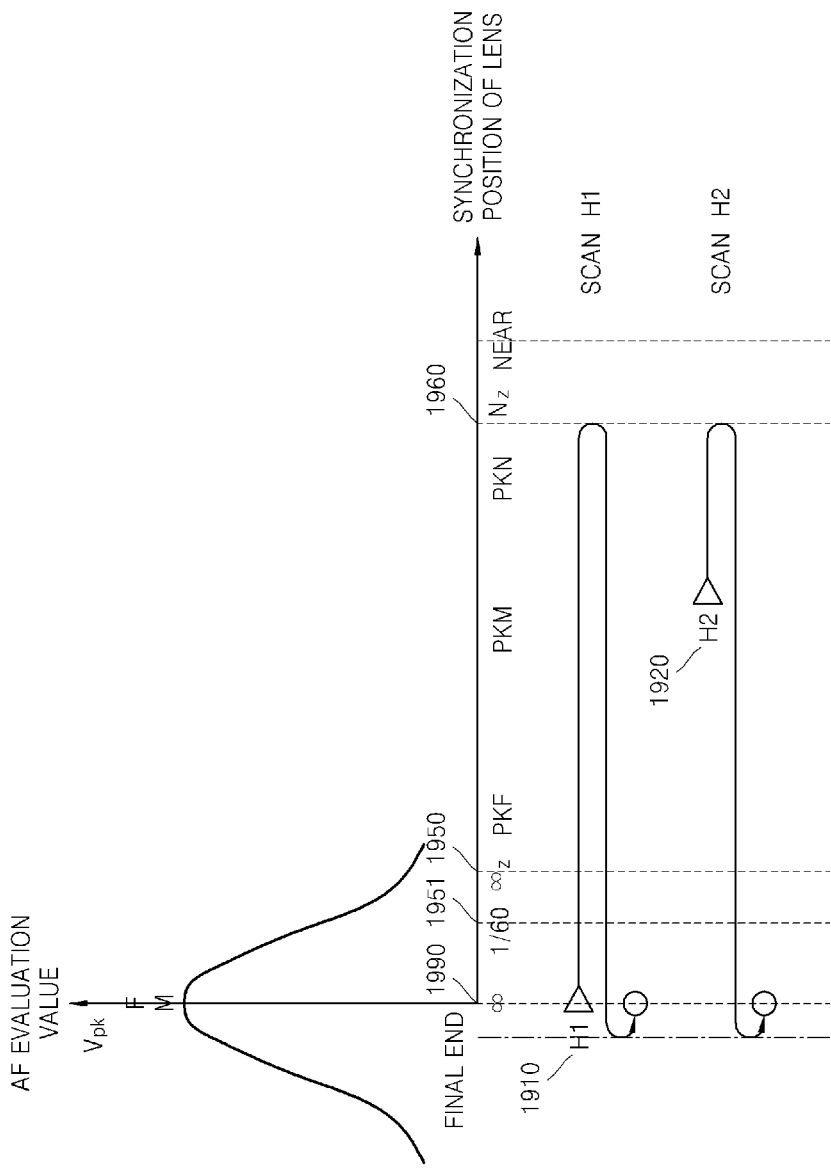
FIG. 19 illustrates application of the multi-AF method illustrated in FIG. 7 in the contrast AF method when all subjects exist at the location ∞, according to an embodiment.

FIG. 19 illustrates application of the multi-AF method illustrated in FIGS. 7A and 7B in the contrast AF method when all subjects exist at the location ∞, according to an embodiment.

In a case H1 (1910), the focus lens is moved in a Near direction from the ∞ point to a range detection point $N_z$ 1960, then the travelling direction of the focus lens is inverted in a ∞ direction. Since a RPP is detected at a range detection point ∞z 1950, the scanning continues in the ∞ direction. Since neither a peak of a near region nor a peak of a central multi-point is detected until a point 1/60 1951, the direction of scanning is inverted at a final end 1910 and continues on up to the point 1990. Then, the lens is focused on a peak $N_0$ existing on the ∞ point 1990.

In a case H2 (1920), after scanning is performed up to the range detection point $N_z$ 1960, the moving direction of the focus lens is inverted and scanning is performed in a ∞ direction. Similar to the case H1, since neither a peak of a near region nor a peak of a central multi-point is detected until the point 1/60 1951, the scanning is performed up to the ∞ point 1990, and then the direction of scanning is inverted at the final end, and the lens is focused on the peak $N_0$ 1990.

FIGS. 20 through 22 illustrate application of the multi-AF method illustrated in FIGS. 7A and 7B in the contrast AF method when scanning is performed from a NEAR point to a ∞ point.

FIG. 20 illustrates an embodiment in which a magnification of a central multi-point is greater than 1/60. In a case A1 (2010), a start point of scanning is located closer to the ∞ point than a peak M of a central multi-point is, and is also located at a point less than the point 1/60. In a case A2 (2020), a start point of scanning is located closer to the ∞ point than the peak M of the central multi-point is, and is also located at a point greater than the point 1/60. In a case A3 (2030), a start point of scanning is located between the peak M of the central multi-point and the NEAR point.

In the cases A1 (2010) and A2 (2020), since a RPP is not detected at a range detection point ∞z 2080, the travelling direction of the focus lens is inverted at the range detection point ∞z 2080 and scanning is performed in the Near direction until a point $N_z$ 2060. Thereafter, the lens is focused on the peak M by applying the multi-AF method.

In a case A3 (2030), scanning is performed in the ∞ direction, and when the peak M is detected, the moving direction of the focus lens is inverted and scanning is performed in a Near direction until the point $N_z$ 2060. Thereafter, the direction of scanning is inverted again at the point $N_z$ 2060, and the lens is focused on the peak M or $N_0$.

FIG. 21 illustrates application of the multi-AF method illustrated in FIGS. 7A and 7B in the contrast AF method when the contrast of the central multi-point cannot be detected, according to an embodiment.

In a case B1 (2110), a start point of scanning is located between range detection points $N_z$ and ∞z. In a case B2 (2120), a start point of scanning is located between the range detection point $N_z$ and the NEAR point.

In the case B1 (2110), since a RPP is not detected at the range detection point ∞z 2180, the direction of scanning is inverted at the range detection point ∞z 2180, toward a Near direction until the range detection point $N_z$ 2160. Thereafter, the lens is focused on a peak $N_0$. In the case B2 (2120), the direction of scanning is inverted at the range detection point ∞z 2180, and the lens is focused on the peak $N_0$.

FIG. 22 illustrates an embodiment in which a subject in a near multi-point exists at an ultra-near location nearer to the photographer than the nearest location detectable by the digital photographing apparatus and a subject in a central multi-point exists at the location ∞. Here, $N_n$ denotes a subject existing closer to a final end than a near subject $N_0$ is.

In a case C1 (2210), a start point of scanning is located between range detection points ∞z 2280 and $N_z$ 2260. In a case C2 (2220), a start point of scanning is a final end 2270.

In the case C1 (2210), since a RPP is detected at the range detection point ∞z 2280, the scanning is performed up to a ∞ point 2290 and then the direction of scanning is inverted at a final end just beyond the ∞ point 2290. Thereafter, a RPP is also detected at the range detection point $N_z$ 2260, and thus the scanning is performed up to a final end 2270. Then, the lens is focused on the near subject $N_0$.

In a case C2 (2220), since a RPP is detected at the range detection point ∞z 2280, the focus lens is moved up to the ∞ point 2290, and the direction is inverted at the final end just beyond the ∞ point 2290. Thereafter, the lens is focused on the near subject $N_0$.

Due to the scanning operations illustrated in FIGS. 12 through 22, the multi-AF method may be implemented at high speed in the contrast AF.

Embodiment I

FIGS. 23 through 26 are flowcharts of an operation of the digital photographing apparatus 1 of FIG. 1.

Figure 23:
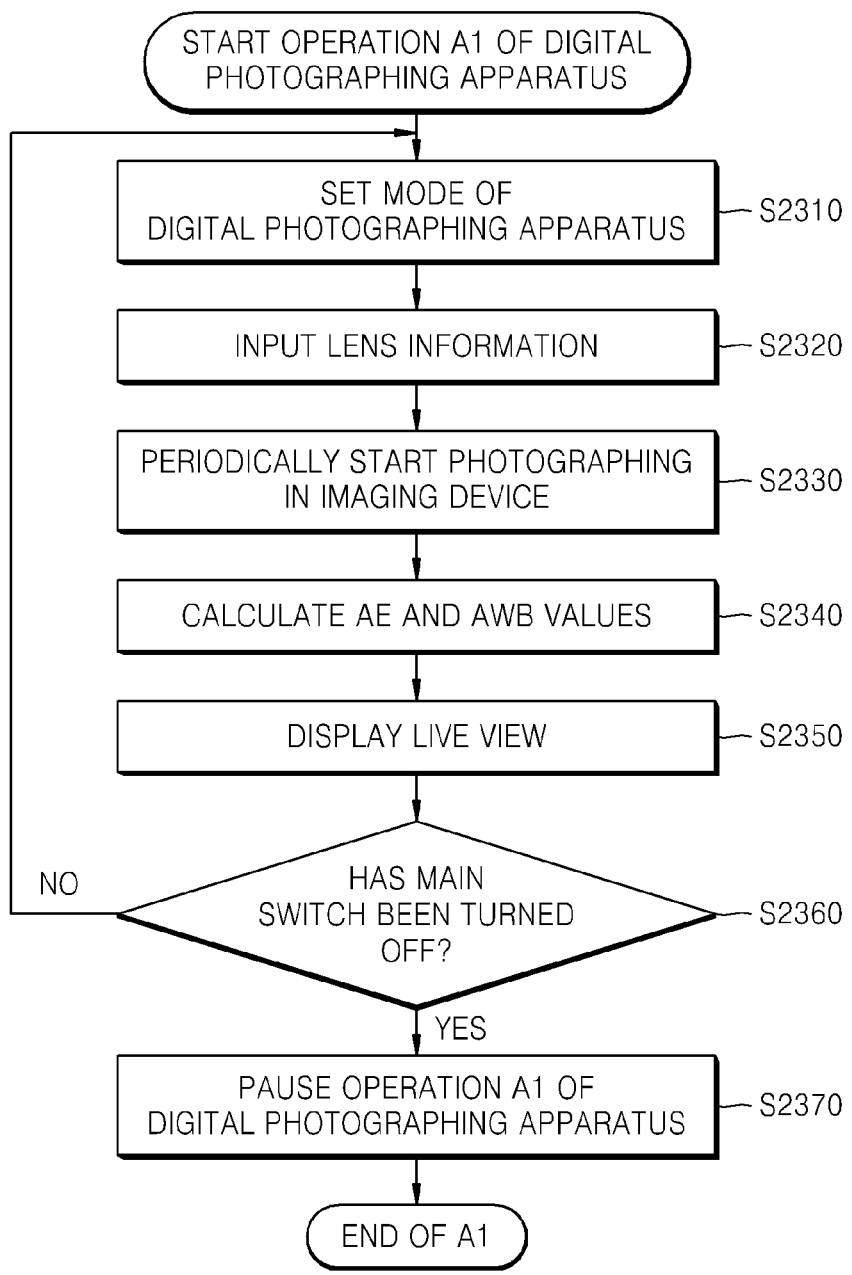
FIG. 23 is a flowchart of a driving process of a digital photographing apparatus, according to an embodiment.

FIG. 23 is a flowchart of a driving process (an operation A1) of the digital photographing apparatus 1, according to an embodiment. In operation S2310, when the main switch SM of the digital photographing apparatus 1 is turned on, the mode of the digital photographing apparatus 1 is set by the manipulation unit 207 or the like. Then, lens information is required as an input to the lens 100 in order to operate the digital photographing apparatus 1 in operation S2320. The lens information corresponds to unique lens parameters stored in the lens memory 112 of FIG. 1, and is necessary for AF, AE, AWB, image quality control, etc.

In operation S2330, the imaging device 204 of FIG. 2 periodically starts photographing. Then, AE and AWB values are calculated in operation S2340, and a live view is displayed in operation S2350. Although the operations S2310 through S2350 are sequentially illustrated, all of the operations S2310 through S2350 may be performed at the same time while image information is being input from the imaging device 204.

In operation S2360, it is determined whether the main switch SM of the digital photographing apparatus 1 has been turned off. If the main switch SM of the digital photographing apparatus 1 has not been turned off, the method is fed back to operation S2310, and a live view display is repeated. On the other hand, if the main switch SM of the digital photographing apparatus 1 has been turned off, operation A1 of the digital photographing apparatus 1 is paused, in operation S2370.

Figure 24A:
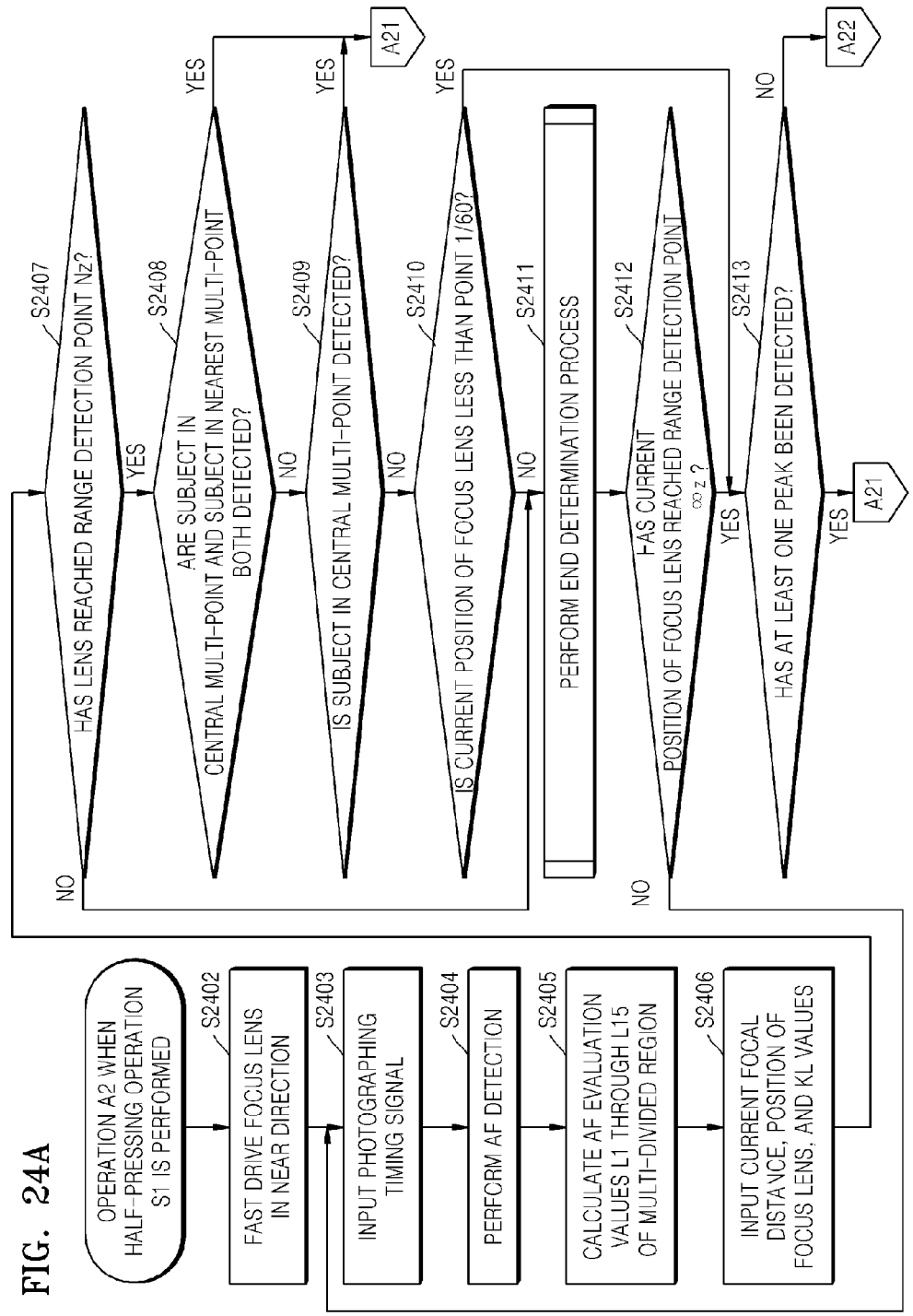
FIGS. 24A and 24B are flowcharts of an operation of AF detection in the digital photographing apparatus when a shutter release button is half pressed in the live view display operation S2350 of FIG. 23, according to an embodiment.
Figure 24B:
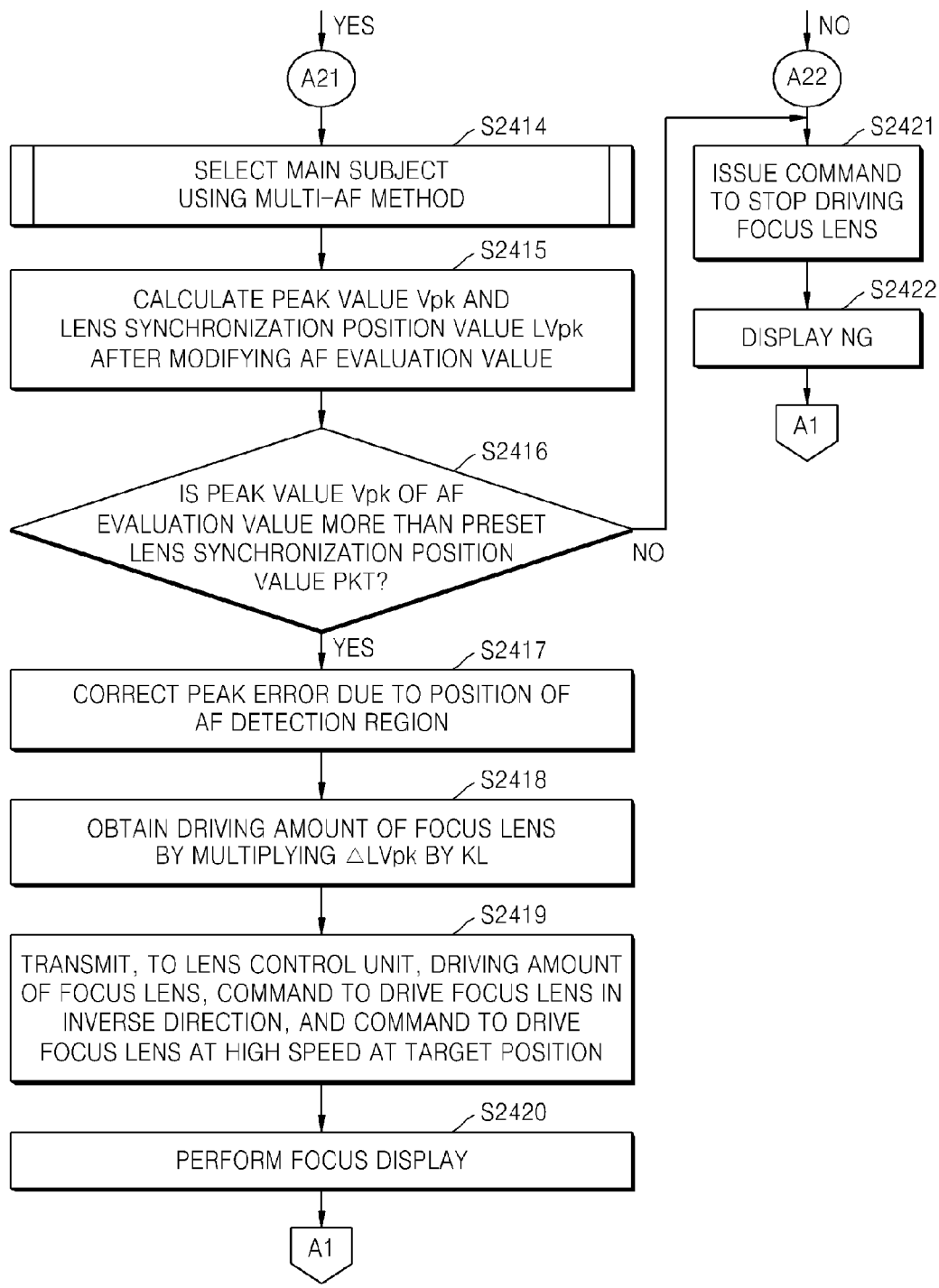

FIGS. 24A and 24B are flowcharts of an operation (A2) of AF detection in the digital photographing apparatus 1 when the shutter release button is half-pressed (operation S1 is performed) in the live view display operation S2350 of FIG. 23, according to an embodiment.

When an interrupt signal of the half-pressing operation S1 is applied in operation S2401, the focus lens 104 is fast driven in a Near direction, in operation S2402. The lens control unit 110 drives the lens 100 at a constant speed in order to achieve contrast AF. When the half-pressing operation S1 has been performed, the driving of the focus lens 104 in the Near direction may decrease an AF time during which the multi-AF method is used. However, various changes in the driving of the focus lens 104 may be made. In the present embodiment, during moving picture photographing, scanning may begin by preferentially performing infinite direction scanning. In more detail, the embodiment as illustrated in FIGS. 20 through 22 may be performed so as to drive the focus lens 104 in an infinite direction.

Thereafter, in operation S2403, a photographing timing signal is input. The photographing timing signal represents the timing when AF detection is initiated. The photographing timing signal is generated to correspond to a set AF detection region. The CPU 224 counts driving signals that are generated in the imaging device control unit 205. When a predetermined number of driving signals are counted, this time is determined as the timing when AF detection is to be initiated.

When the photographing timing signal is input, the imaging device 204 inputs an image signal of an AF region to an AF detection circuit of the pre-processor 220 of the camera control unit 209 and performs AF detection, in operation S2404. The AF detection enables the AF evaluation values L1 through L15 (corresponding to e1 through e15 of FIG. 3A) of a multi-divided region to be calculated. In this case, the multi-divided region, namely, a focus detection region, is the same as that illustrated in FIGS. 3A and 3B. The focus detection region is divided into 15 regions e1 through e15 of FIG. 3A. In operation S2405, the AF evaluation values L1 through L15 are calculated from the multi-divided region. In other words, the AF evaluation values L1 through L15 may be obtained from the 15 regions e1 through e15, respectively.

After the AF evaluation values are calculated, a current focal distance, a position of the focus lens 104 at the AF detection timing, and conversion coefficient KL values corresponding to the conversion coefficients of the focus lens driving amount and the focus deviation amount of a photographing lens are input to the lens 100, in operation S2406. The KL values are stored together with the AF evaluation values by making sets.

Thereafter, in operation S2407, it is determined whether the lens has reached the range detection point N. When the lens has reached the range detection point $N_z$ at least once, the method proceeds to operation S2408. The case where the lens has reached the range detection point $N_z$ at least once includes both a case where the lens has reached the range detection point $N_z$ while moving from the infinite direction to the Near direction and a case where the lens is inversely driven from the Near direction to the infinite direction after the lens has reached the point N.

When a subject in a central multi-point and a subject in a nearest multi-point, which is closest to a photographer, are both detected in operation S2408, or when the subject in the region nearest to the photographer is not detected but the subject in the central multi-point is detected in operation S2409, operation S2414 (see FIG. 24B) in an AF process A21 is performed. When the subject in the region nearest to the photographer is not detected but the subject in the central multi-point is detected in operation S2409, the subject in the central multi-point may be considered as a subject nearest to the photographer.

In operation S2410, it is determined whether the current position of the focus lens 104 is less than the point ⅟60. If the current position of the focus lens 104 is less than the point ⅟60, it is determined whether at least one peak region has been detected, in operation S2413. If at least one peak region has been detected, the AF process A21 is conducted. Otherwise, a process A22 (see FIG. 24B) is conducted.

On the other hand, if the current position of the focus lens 104 is not less than the point ⅟60, an end determination process S2411 is performed, which will be described later with reference to FIG. 25. Thereafter, in operation S2412, it is determined whether the current position of the focus lens 104 has reached a range detection point ∞z for an infinite direction. If the current position of the focus lens 104 has not reached the range detection point ∞z, the method is fed back to operation S2403 in order to continuously perform scanning, and a photographing timing signal is input.

On the other hand, if the current position of the focus lens 104 has reached the range detection point ∞z, it is determined whether at least one peak has been detected, in operation S2413. In more detail, while the moving direction of the focus lens is inverted after scanning up to the nearest multi-point and the scanning is being performed up to the point ⅟60, if at least the nearest subject is detected, the AF process A21 (including operations S2414 through S2420) is conducted. On the other hand, if no peaks are detected, a process A22 (including operations S2421 and S2422) is conducted.

The AF process A21 (including operations S2414 through S2420) will now be described in detail with reference to FIG. 24B. If at least one peak is detected in operation S2413, first, a main subject is selected using the multi-AF method, in operation S2414. Thereafter, in operation S2415, an AF evaluation value is modified to calculate the peak value Vpk and the lens synchronization position value LVpk. In operation S2416, it is determined whether the peak value Vpk of the AF evaluation value is greater than a predetermined lens synchronization position value $PK_T$. If the peak value Vpk is greater than the predetermined lens synchronization position value PKT, a peak error due to the position of an AF detection region is corrected, in operation S2417. The peak error is referred to as ΔIB, and denotes an error due to a difference between the frequency of performing the AF detection by the photographing lens and the frequency of actual AF detection. A peak error correction value that is changed by the focus detection region is referred to as ΔIBoff. Thus, in operation S2417, the peak error correction value ΔIBoff obtained by the correction of the position of the AF detection region is corrected. In general, in operation S2417, a defocus amount is expressed in units of μm. Thereafter, in operation S2418, the driving amount of the focus lens 104 is determined by multiplying the conversion coefficient KL of the focus lens driving amount of the photographing lens by the conversion coefficient KL of the focus deviation amount of the photographing lens $\Delta LV_{PK}$. The conversion coefficients KL used in operation S2418 are conversion coefficients KL that are closest to the lens synchronization position value LVpk.

Then, in operation S2419, the camera control unit 209 transmits, to the lens control unit 110, the driving amount of the focus lens 104, a command to drive the focus lens 104 in an inverse direction, and a command to drive the focus lens 104 at high speed at a target position, which is ascertained in operation S2418. In operation S2419, the lens drives the focus lens 104 to the target position by initiating inverse direction driving, so that the lens is brought into focus. In operation S2420, a focus display is performed for a predetermined period of time, and then the AF process A21 is concluded. Thereafter, the method is fed back to operation A1 of the digital photographing apparatus 1 illustrated in FIG. 23, and thus a live view display is performed.

The process A22 (including the operations S2421 and S2422) will now be described in greater detail with reference to FIG. 24B. In operation S2421, a command to stop driving the focus lens 104 is issued according to a determination that the contrast of a subject is low. Then, in operation S2422, NG (meaning "no good", i.e., fail) is displayed. Then, the method is fed back to operation A1 of the digital photographing apparatus 1 illustrated in FIG. 23, and thus a live view image is displayed.

Figure 25:
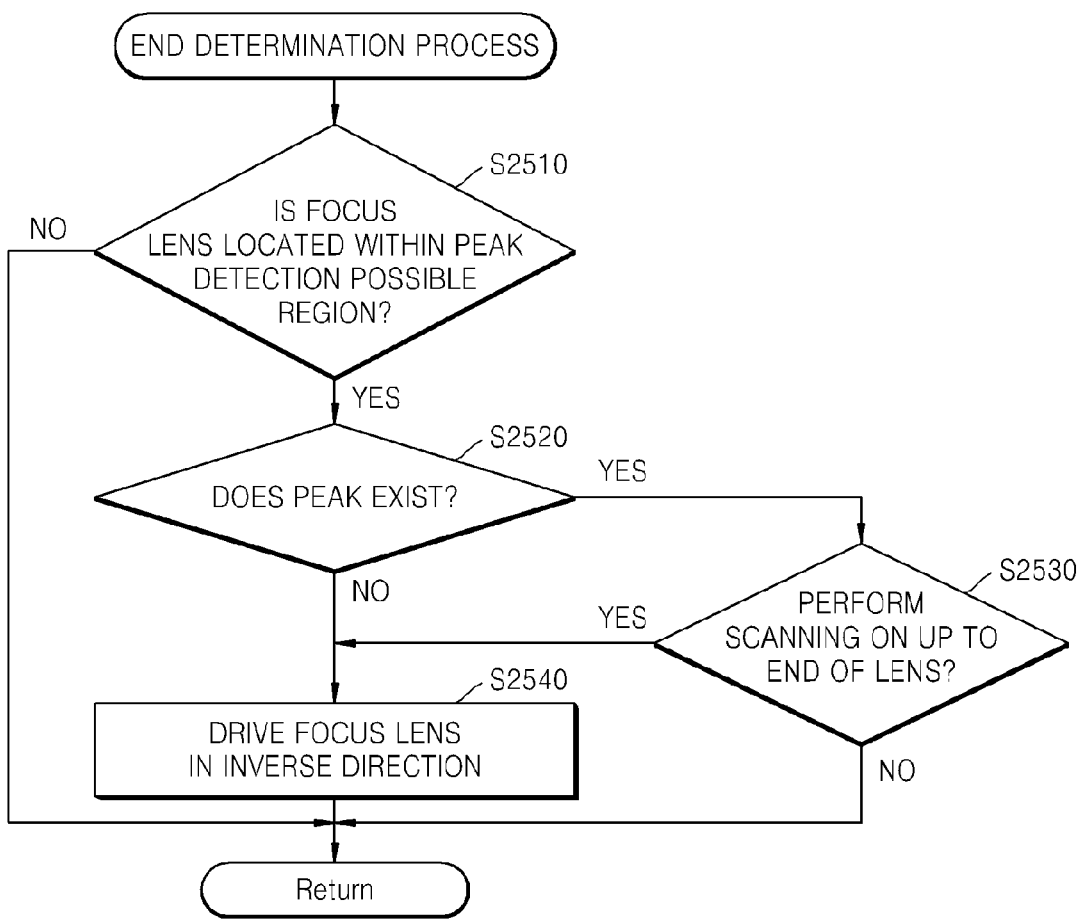
FIG. 25 is a flowchart of an end determination process included in the operation of the digital photographing apparatus illustrated in FIG. 24A, according to an embodiment.

FIG. 25 is a flowchart of the end determination process S2411 included in the operation of the digital photographing apparatus 1 illustrated in FIG. 24A, according to an embodiment.

First, in operation S2510, it is determined whether the focus lens 104 is located within a RPP. The RPP denotes a region where it is determined whether there is a possibility that a peak exists. Further, $N_z$ and ∞z denote range detection points where it is determined whether peaks can exist after the point $N_z$ and before the point ∞z. Thus, $N_z$ and ∞z are used to determine a RPP. The point $N_z$ denotes a range detection point near the NEAR point, and the point ∞ denotes a range detection point near the ∞ point.

If it is determined in operation S2510 that the focus lens 104 is located within the RPP, it is determined whether a peak exists, in operation S2520. The determination as to whether a peak exists refers to FIG. 9. If a peak exists, the focus lens 104 is moved up to the end of the scan range, in operation S2530. On the other hand, if no peaks exist, the focus lens 104 is driven in an inverse direction by changing the direction of the scanning, in operation S2540. In this case, if the focus lens has not moved up to the end of the scan range, the moving direction of the focus lens 104 is inverted immediately. If it is determined in operation S2510 that the focus lens 104 is outside the RPP, the focus lens is also returned.

FIGS. 26A, 26B, and 26C are flowcharts of an operation of the digital photographing apparatus when the shutter release button is fully pressed (the full-pressing operation S2 is performed), according to an embodiment.

After the AF operation A2 is completed with the half-pressing operation 51 performed in FIG. 24A, the full-pressing operation S2 is performed, and an operation A3 starts. In operation S2601, it is determined whether a photographing mode is a moving picture mode.

If the photographing mode is not determined to be a moving picture mode in operation S2601 and the lens is in-focus in operation S2602, a still picture is captured and then a captured image is displayed for a predetermined period of time, in operations S2603 and S2604. Thereafter, the method is fed back to operation A1 illustrated in FIG. 23 to perform live view display.

If the photographing mode is determined to be a moving picture mode in operation S2601, a moving picture starts being captured, in operation S2605. Then, when the shutter release button is fully pressed (S2) again, the capturing is paused. Then, in operation S2606, it is determined whether the lens is in-focus. If it is determined in the operation S2606 that the lens 100 is in-focus, it is determined whether a predetermined period of time Tw has lapsed, in operation S2607. In the moving picture mode, since a continuous AF is performed, AF is gradually performed during the predetermined period of time Tw in order to bring the lens into focus. If it is determined in operation S2606 that the lens is focused, the predetermined period of time Tw lapses in operation S2607, and then the focus lens is driven at low speed in the Near direction, in operation S2608. The predetermined period of time Tw may be set to be about 500 ms to about 1 s. On the other hand, if it is determined in operation S2606 that the lens is out of focus, the focus lens is driven at low speed in the Near direction in operation S2608 without passing through operation S2607. In order to drive the focus lens at low speed in the Near direction, a command to drive the focus lens at low speed in the Near direction is transmitted to the lens 100. Since the lens control unit 110 of FIG. 1 performs continuous AF, the lens control unit 110 drives the lens at a lower speed than when performing general AF.

Thereafter, a multi-divided focus detection region, for example a multi-AF region illustrated FIG. 3A, is changed in accordance with the moving picture mode, for example a multi-AF region illustrated FIG. 4A, in operation S2609 illustrated in FIG. 25B. In the moving picture mode, the multi-divided focus detection region is divided into larger regions. For example, in a half-pressing operation 51, a multi-divided focus detection region as in FIG. 3A is used. In the moving picture mode, a multi-divided focus detection region as in FIG. 4A is used.

Referring to FIG. 26B, in operation S2610, a photographing timing signal is input according to the changed multi-divided focus detection region. The photographing timing signal denotes a timing signal that initiates AF detection and is generated for a position of a focus detection region. Thus, a photographing timing signal suitable for a change made in the multi-divided focus detection region according to the moving picture mode is generated. The photographing timing signal may be generated through a process in which the CPU 224 counts driving signals generated in the imaging device control unit 205 of FIG. 2.

When the photographing timing signal is input in operation S2610, an AF detection circuit in the pre-processor 220 of FIG. 2 detects AF, in operation S2611. In operation S2612, the AF evaluation values L16, L17, and L18 of focus detection regions corresponding to the regions e16, e17, and e18 of FIG. 4A are calculated.

Thereafter, in operation S2613, the lens 100 inputs a current focal distance, a position of the focus lens 104 at the AF detection timing, and KL values corresponding to the conversion coefficients of the focus lens driving amount and the focus deviation amount of a photographing lens. The KL values are stored together with their corresponding AF evaluation values.

In operation S2614 and its subsequent operations, scanning is performed to apply the multi-AF method. When a peak of each focus detection region is obtained, a main subject is selected according to the multi-AF method, in operation S2631 illustrated in FIG. 26C. The multi-AF method refers to FIG. 31. In the moving picture mode, the multi-divided focus detection region of FIG. 4A may be used.

First, in operation S2614, it is determined whether the lens has reached the range detection point N. When the lens has reached the range detection point $N_z$ at least once, the method proceeds to operation S2615. The case where the lens has reached the range detection point $N_z$ at least once includes both a case where the lens has reached the range detection point $N_z$ while moving from the infinite direction to the Near direction and a case where the lens is inversely driven from the Near direction to the infinite direction after the lens has reached the point N.

When a subject in a central multi-point and a subject in a region nearest to a photographer are both detected in operation S2615, or when the subject in the region nearest to the photographer is not detected but the subject in the central multi-point is detected in operation S2616, operation S2631 (see FIG. 26C) in a process A32 is performed. When both subjects in the region nearest to the photographer and in the central multi-point are not detected in operation S2615 and the subject in the central multi-point is not detected in operation S2616, it is determined whether the current position of the focus lens 104 is less than the point ⅟60, in operation S2617.

If the current position of the focus lens 104 is less than the point ⅟60, it is determined whether at least one peak region has been detected, in operation S2620. If at least one peak region has been detected, the process A32 is conducted. Otherwise, a process A33 is conducted.

On the other hand, if the current position of the focus lens is not less than the point 1/60, an end determination process S2618 is performed. The end determination process S2618 refers to FIG. 25. Thereafter, in operation S2619, it is determined whether the current position of the focus lens 104 has reached a range detection point ∞z for an infinite direction. If the current position of the focus lens 104 has not reached the range detection point ∞z, the method is fed back to operation S2609 in order to continuously perform scanning, and a photographing timing signal is input.

On the other hand, if the current position of the focus lens has reached the range detection point ∞z, it is determined whether at least one peak has been detected, in operation S2620. In more detail, while the moving direction of the focus lens is changed after scanning up to the nearest multi-point and the scanning is being performed up to the point 1/60, if at least the nearest subject is detected, the process A32 is conducted. On the other hand, if no peaks are detected, the process A33 is conducted.

Referring to FIG. 26C, if at least one peak is detected in operation S2620, first, a main subject is selected using the multi-AF method, in operation S2631. Thereafter, in operation S2632, an AF evaluation value is modified to calculate the peak value Vpk and the lens synchronization position value LVpk. In operation S2633, it is determined whether the peak value Vpk of the AF evaluation value is greater than a predetermined lens synchronization position value PKT. If the peak value Vpk is greater than the predetermined lens synchronization position value PKT, a peak error due to the position of an AF detection region is corrected, in operation S2634.

Thereafter, in operation 2635, the driving amount of the focus lens 104 is determined by multiplying the focus deviation amount of the photographing lens ΔLVpk by the conversion coefficient KL.

Then, in operation S2636, the camera control unit 209 transmits, to the lens control unit 110, the driving amount of the focus lens 104, a command to drive the focus lens 104 in an inverse direction, and a command to drive the focus lens 104 at high speed at a target position, which is ascertained in operation S2635. In operation S2636, the lens drives the focus lens to the target position by initiating inverse direction driving, so that the lens is brought into focus.

In operation S2637, it is determined whether the full-pressing operation S2 has been performed. If the full-pressing operation S2 has not been performed, operation S2606 of the process A31 of FIG. 26A is conducted to continue capturing a moving picture and a continuous AF operation. If the shutter button is fully pressed (S2) again, moving picture photographing is concluded, in operation S2638. Thereafter, operation A1 of FIG. 23 is performed again, and live view display is performed.

In operation A33, if the peak value Vpk of the AF evaluation value is not greater than the predetermined lens synchronization position value $PK_T$ in operation S2633, a focus lens driving stop command is issued, in operation S2639. Thereafter, the operations S2637 and S2638 are performed.

Embodiment 2

Figure 10:
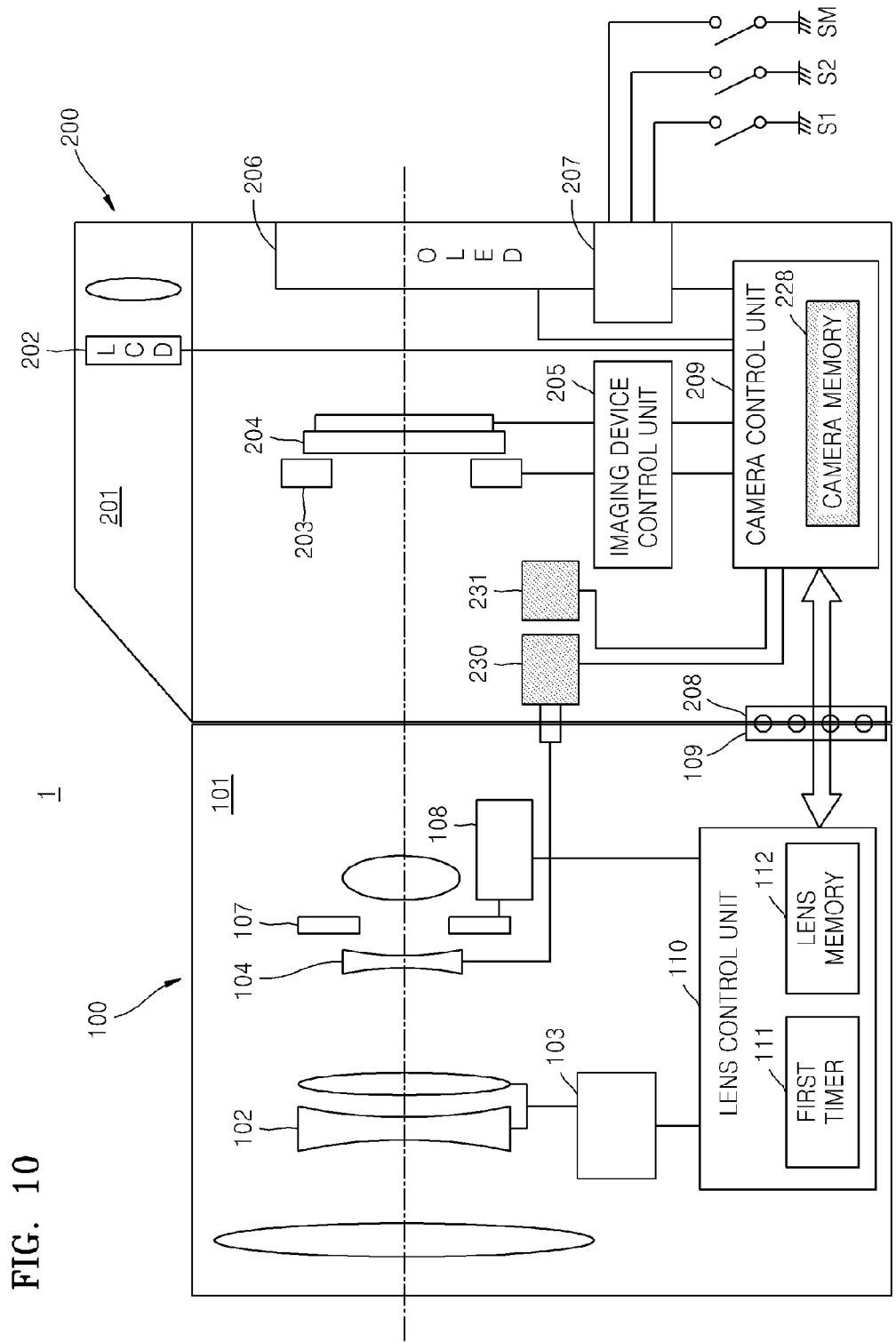
FIG. 10 is a schematic diagram of an interchangeable-lens digital photographing apparatus, according to another embodiment.

FIG. 10 is a schematic diagram of an interchangeable-lens digital photographing apparatus 1 according to another embodiment.

The lens driving actuator 105 and the focus lens position detecting sensor 106 are included in the image-forming optical system 101 in FIG. 1, whereas a camera which is an example of the digital photographing apparatus 1 of FIG. 10 includes an image-forming optical system 101 without a lens driving actuator and a focus lens position detecting sensor. Instead, a body unit 200 of the camera of FIG. 10 includes a lens driving actuator 230 for driving a focus lens group along an optical axis, and a position sensor 231 for sensing the position of the focus lens group, and a camera control unit 209 includes a camera memory 228.

The camera memory 228 stores an error value ΔIB due to unique information about a lens or a difference between the lens and the frequency of AF detection, and a correction value ΔIBoff that is changed according to a focus detection region. As such, in the embodiment of FIG. 10, lens information may be stored and retained in the body unit 200. Thus, even when an interchangeable photographing lens is old and thus information about the interchangeable photographing lens is not sufficient, the lens information stored in the body unit 200 may be used.

Components of FIG. 10 corresponding to those of FIG. 1 have the same or similar functions except for the above-described difference, so a detailed description thereof will be omitted. In addition, the digital photographing apparatus 1 of FIG. 10 may also use the multi-divided AF detection region illustrated in FIG. 3A, 4A, or 5.

An operation of the digital photographing apparatus 1 of FIG. 10 is almost the same as that illustrated in FIGS. 23 through 26 except that unnecessary operations, such as transmission of a driving amount, a direction change command, and a command to drive the focus lens fast at a target position from an interchangeable lens, are performed. In addition, the operation of the digital photographing apparatus 1 of FIG. 10 may be different from that illustrated in FIGS. 23 through 26 in terms of automatically controlled parts of a body unit of a digital photographing apparatus, a multi-AF method, and the like. Furthermore, focus detection regions, regarding which focus detection is performed during moving picture photographing, are the regions e16 through e18 of FIG. 4A in the operation of the digital photographing apparatus 1 of FIG. 10, whereas, in the operation illustrated in FIGS. 23 through 26, the focus detection regions are the regions e19 through e21 of FIG. 5.

The multi-AF method used in the digital photographing apparatus 1 of FIG. 10 may be changed. For example, $β_m$ may be set to be 1/100 in FIG. 7B. Thus, when the magnification $β_m$ of the central multi-point of the image is greater than 1/100, the central multi-point is selected. When the magnification $β_m$ of the central multi-point of the image is less than 1/100, the nearest multi-point is selected. Since the multi-AF method is changed, it is determined whether the current position of the focus lens 104 is less than 1/100, in operation S2410. The magnification $β_m$ of the central multi-point of the image may be changed according to the format of an imaging device.

Figure 31:
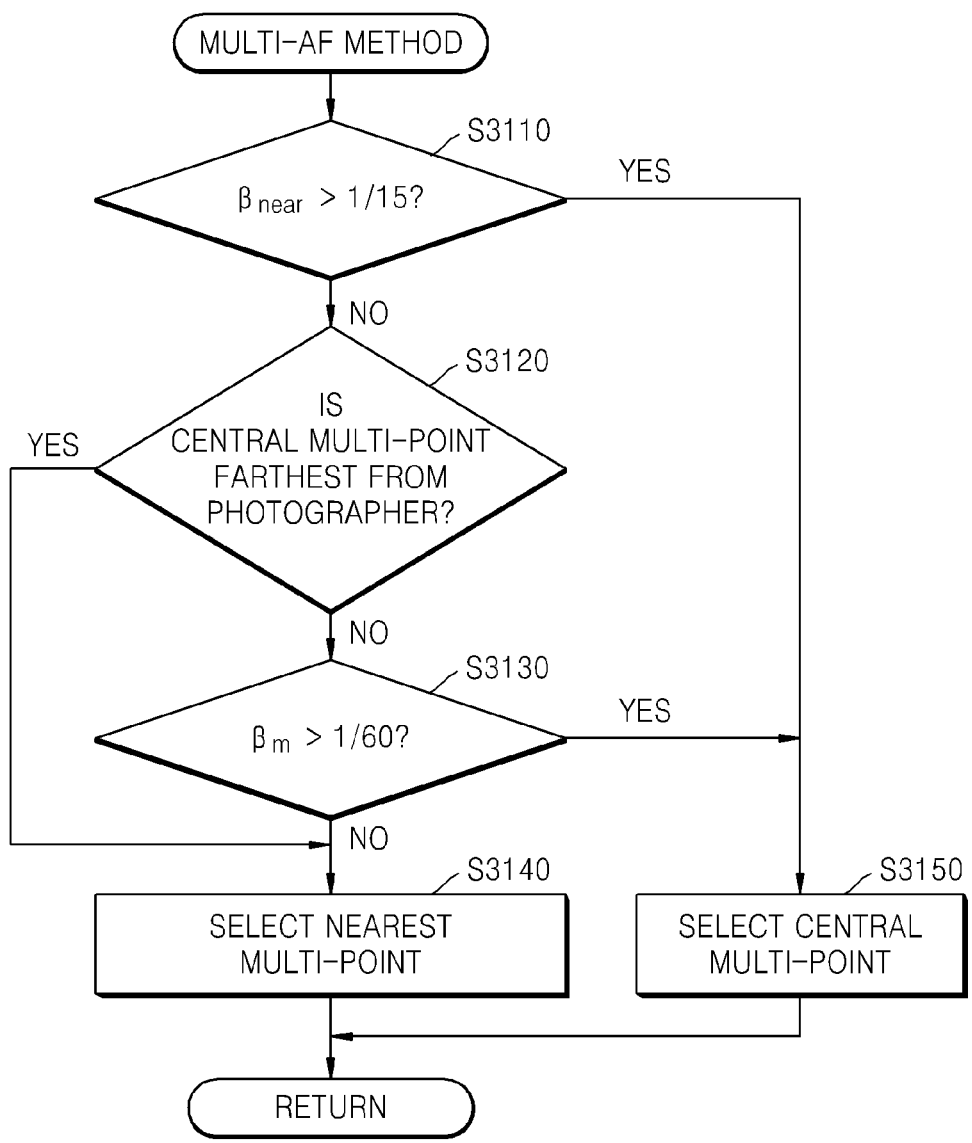
FIG. 31 is a flowchart of a multi-AF method, according to an embodiment.
Figure 32:
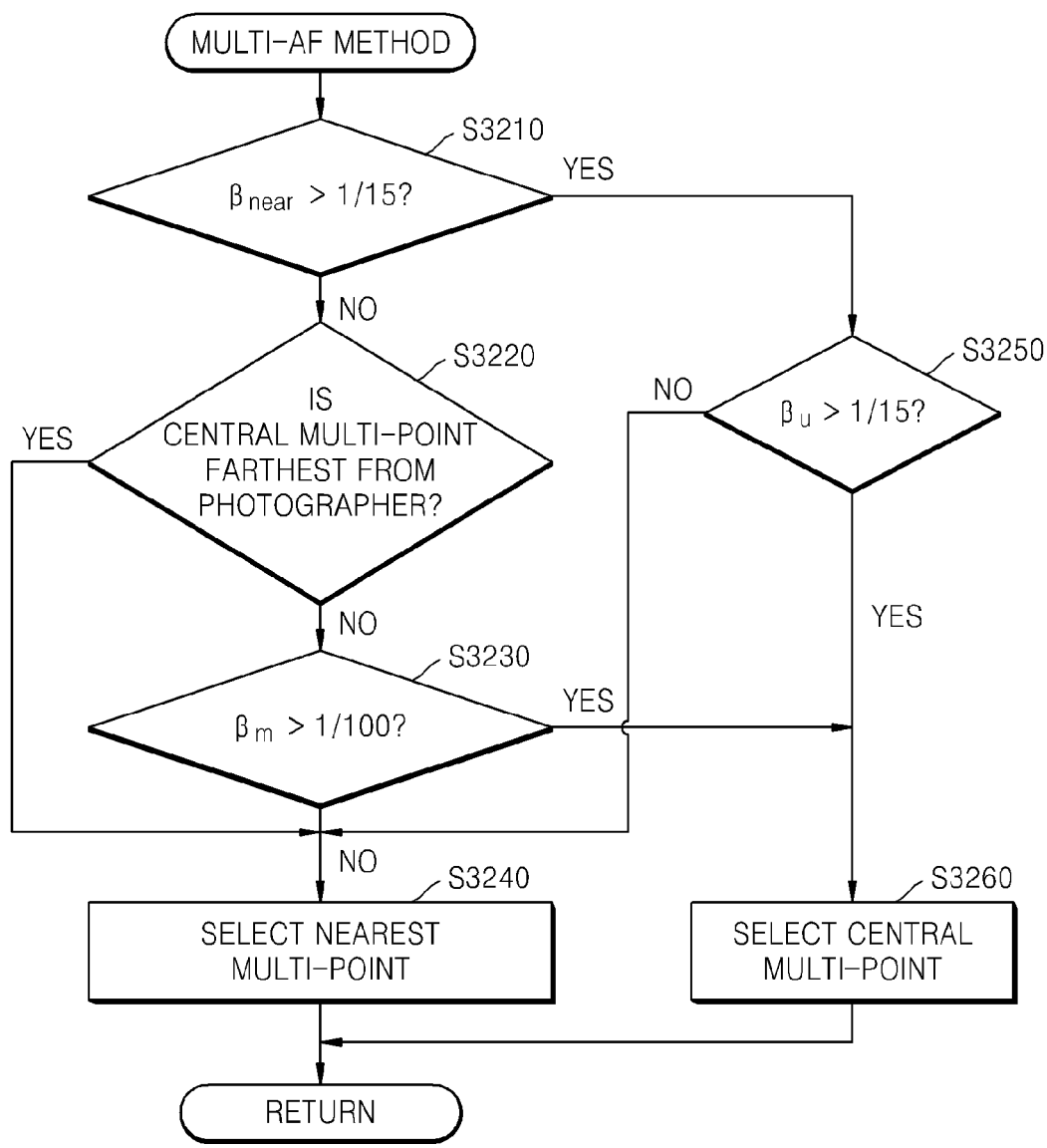
FIG. 32 is a flowchart of a multi-AF method, according to another embodiment.

The multi-AF method in the embodiment 2 refers to FIG. 32, which is described below. In FIG. 32, a magnification of a central multi-point of an image of FIG. 31 is changed from 1/60 to 1/100, and thus the magnification βu of the region directly over the central multi-point of the image may be further used during macro photography.

Embodiment 3

A digital photographing apparatus having a lens and a body unit integrally formed in one body will now be described by focusing on differences between the digital photographing apparatus having a lens and a body unit integrally formed in one body and the above-described digital photographing apparatuses 1.

Figure 11:
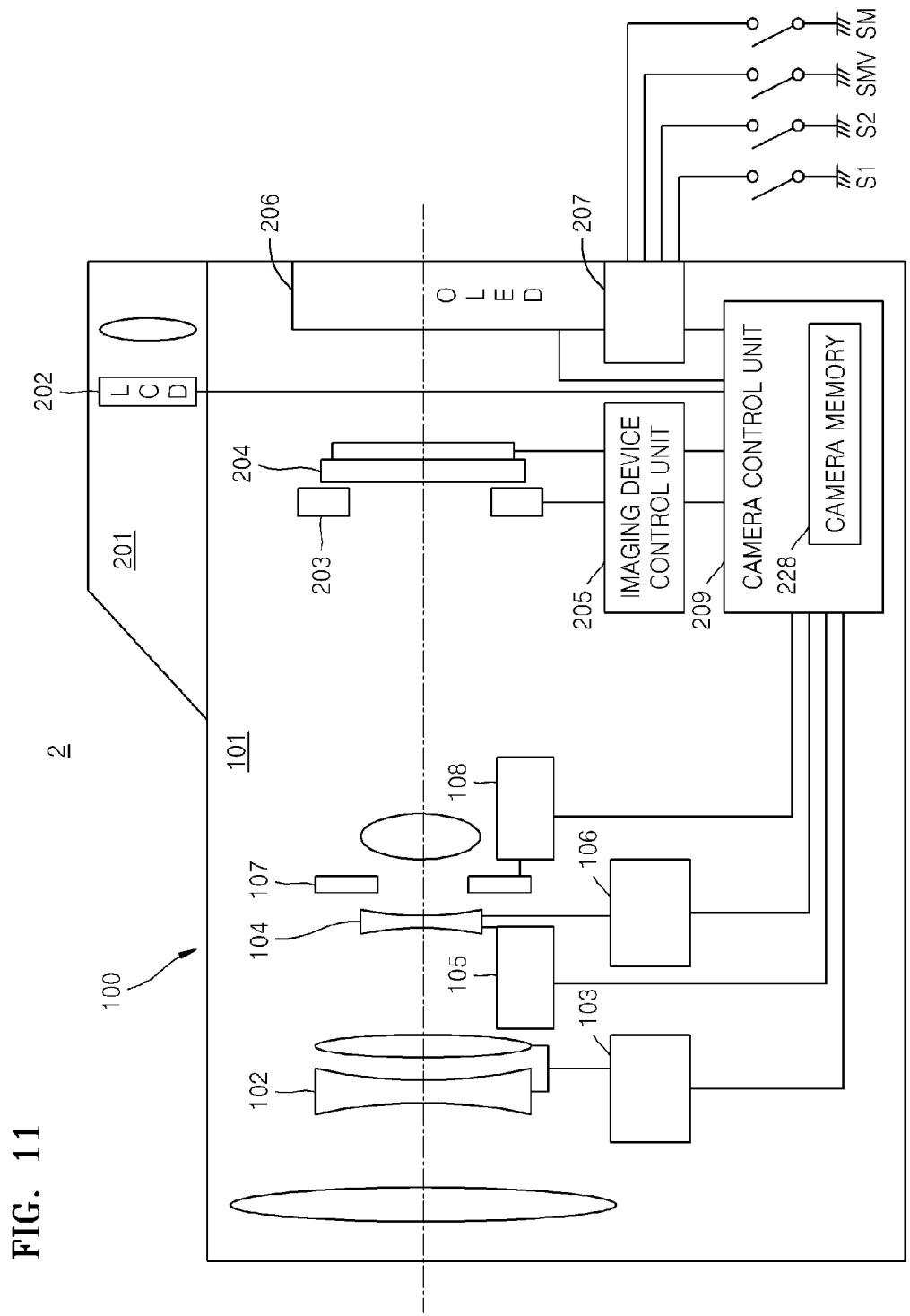
FIG. 11 is a schematic diagram of a digital photographing apparatus having a lens and a body unit integrally formed in one body, according to another embodiment of the present invention.

FIG. 11 is a schematic diagram of a digital photographing apparatus 2 having a lens and a body unit integrally formed in one body, according to another embodiment.

The digital photographing apparatus 2 according to the present embodiment has a structure and a function similar to those of the digital photographing apparatus 1 of FIG. 1, so only differences therebetween will be described.

Since the digital photographing apparatus 2 according to the present embodiment includes a lens 100 and a body unit 200 integrally formed in one body, the lens 100 cannot be replaced. In addition, since the lens 100 and the body unit 200 are integrally formed in one body as described above, the lens mount 109 and the camera mount 208 do not exist in the digital photographing apparatus 2.

Thus, the camera control unit 209 directly controls the lens driving actuator 105, the iris driving actuator 108, etc. to drive the zoom lens 102, the focus lens 104, the iris 107, etc. The camera control unit 209 directly receives position information from the zoom lens position detecting sensor 103 and the focus lens position detecting sensor 106. In other words, the camera control unit 209 according to the present embodiment serves as the lens control unit 110 of FIG. 1.

The digital photographing apparatus 2 according to the present embodiment may further include a switch SMV for manipulating the digital photographing apparatus 2 to initiate a moving picture photographing operation. The digital photographing apparatus 2 according to the present embodiment operates in almost the same manner as the digital photographing apparatus 1 illustrated in FIGS. 23 through 26, but the digital photographing apparatus 2 previously retains information about interchangeable lenses. Thus, the digital photographing apparatus 2 does not require a process of inputting information about interchangeable lenses.

FIGS. 27 through 30 illustrate an operation of the digital photographing apparatus 2 illustrated in FIG. 11.

Figure 27:
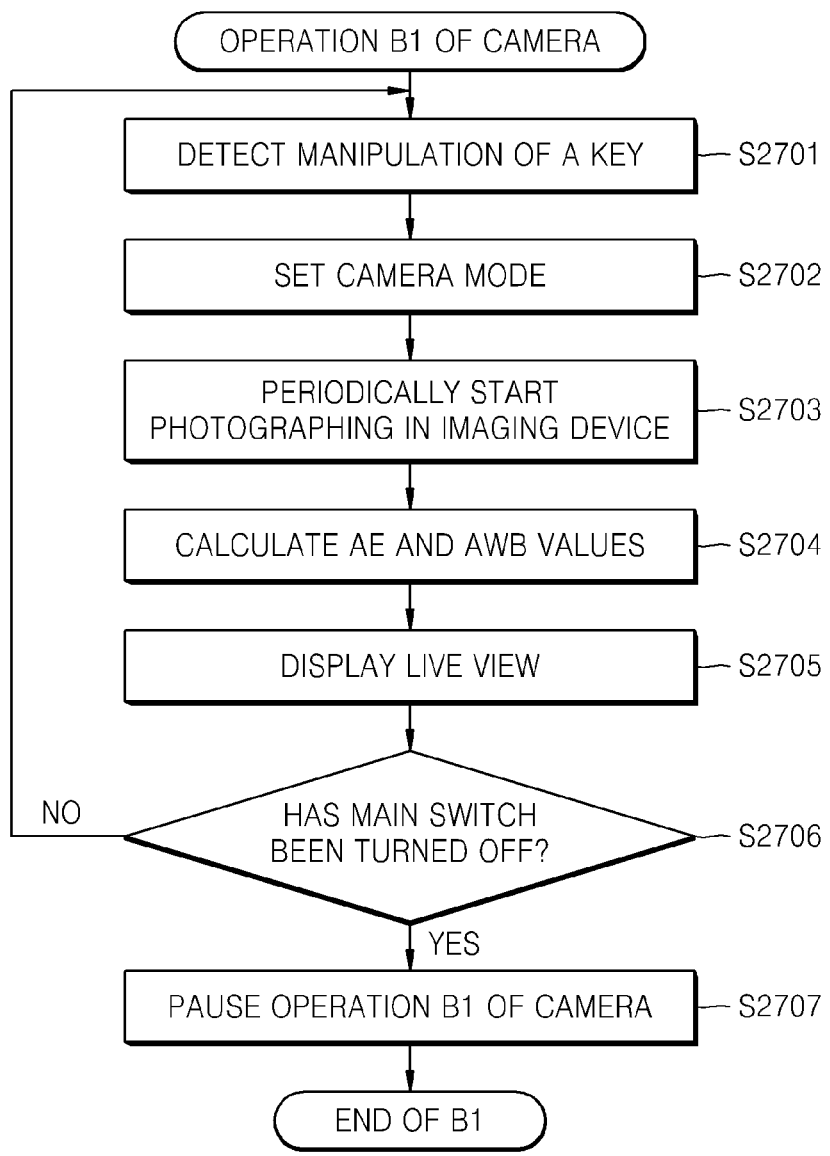
FIG. 27 illustrates a live view operation performed by a camera which is an example of a digital photographing apparatus, according to an embodiment.

FIG. 27 illustrates a live view operation (an operation B1) performed by a camera which is an example of a digital photographing apparatus, according to an embodiment. When a main switch SM of the camera is turned on and thus the camera is driven, manipulation of a key of the manipulation unit 207 is detected, in operation S2701. In operation S2702, a camera mode is set. Examples of the camera mode include a still picture mode, a moving picture mode, etc. In the embodiment 1, lens information about an interchangeable lens, which is necessary for a camera operation, is input. However, in the embodiment 3, the process of inputting the lens information is not required. An operation S2703 and its subsequent operation are substantially the same as or similar to those in the embodiment 1, so a detailed description thereof will be omitted.

Figure 28A:
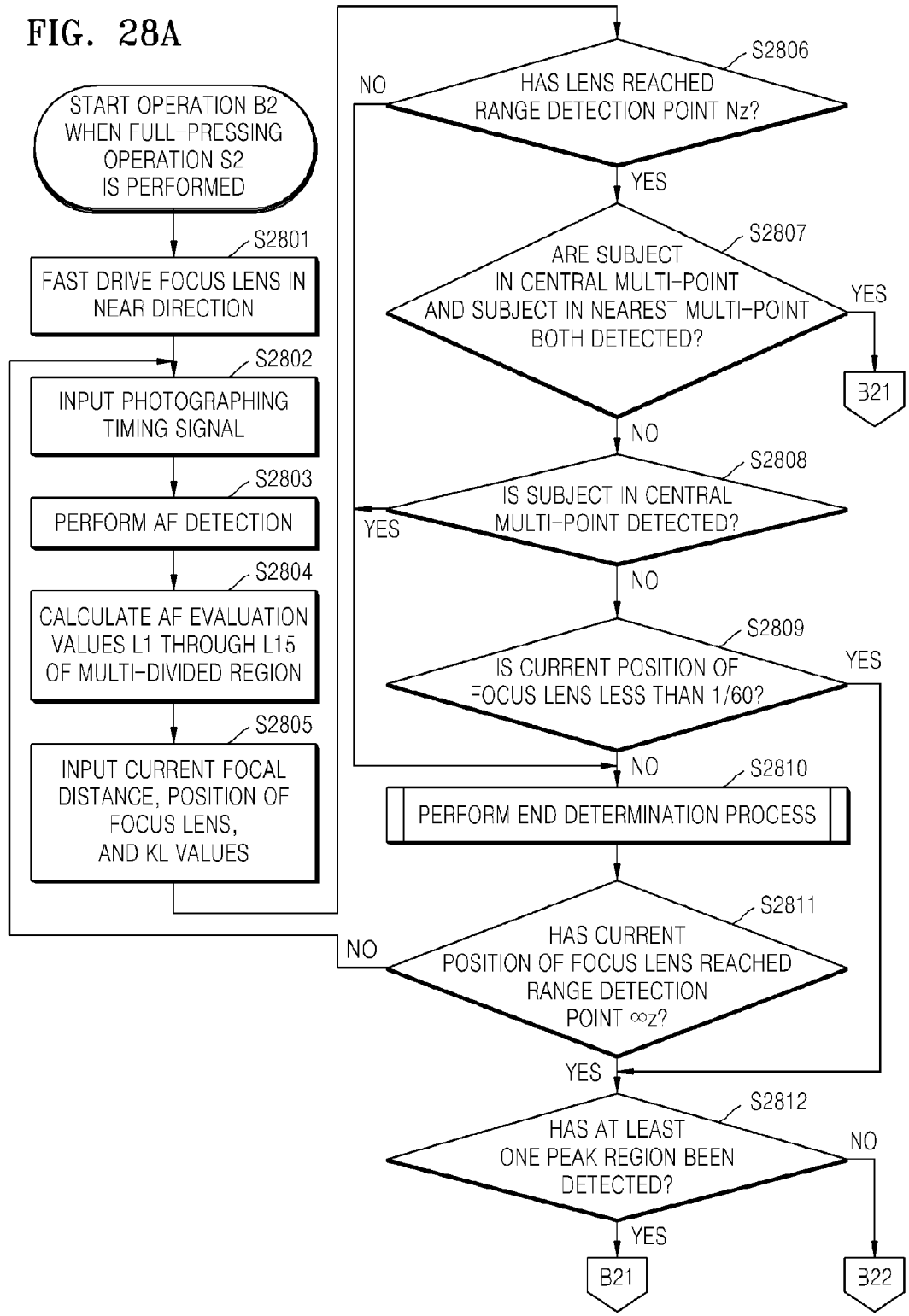

FIGS. 28A and 28B are flowcharts of an operation of an all-in-one camera which is an example of an all-in-one digital photographing apparatus, according to an embodiment.

In a live view operation B1 of FIG. 27, when the half-pressing operation S1 is performed, an operation B2 is initiated in FIG. 28A. In the embodiment 3, the multi-AF detection region illustrated in FIG. 3A may be used, and the multi-AF method illustrated in FIG. 31 may be used. The other features illustrated in FIGS. 28A and 28B are the same as or similar to those illustrated in FIGS. 24A and 24B, so they refer to FIGS. 24A and 24B.

In the embodiment illustrated in FIGS. 28A and 28B, when scanning is performed in the Near direction, the AF scanning is fast, and a change in a viewing angle is large. On the other hand, when scanning is performed in the infinite direction, the AF scanning is slow, and a change in a viewing angle is small. Thus, the still picture mode prefers to begin by scanning toward the Near direction, and the moving picture mode prefers to begin by scanning toward the infinite direction.

When a subject is detected in a central multi-point in operation S2808, scanning continues in order to find a nearest subject even when the subject is detected in the central multi-point, in operation S2810. On the other hand, even when the nearest subject has been detected, scanning is performed to find a central multi-point.

Figure 29:
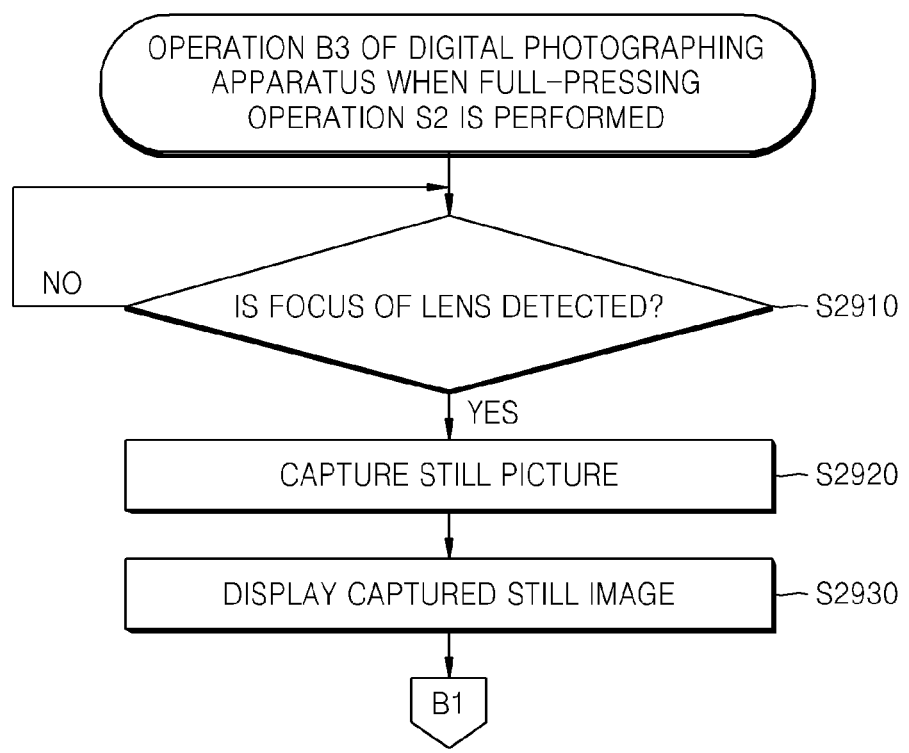
FIG. 29 is a flowchart of an operation of the digital photographing apparatus when the shutter release button is fully pressed, according to an embodiment.

FIG. 29 is a flowchart of an operation (B3) of the digital photographing apparatus when the shutter release button is fully pressed (full-pressing operation S2) is performed, according to an embodiment.

A case where the full-pressing operation S2 is performed while a live view is being displayed after AF is completed is referred to as an operation B3. When the full-pressing operation S2 is performed, it is determined whether the focus of a lens is detected, in operation S2910. The determination is repeated until the lens focus detection is performed. When the lens focus detection is performed, a still picture is captured, in operation S2920. In operation S2930, a still image captured for a predetermined period of time is displayed. Then, the method is fed back to operation B1 of FIG. 27, and a live view is displayed.

Figure 30A:
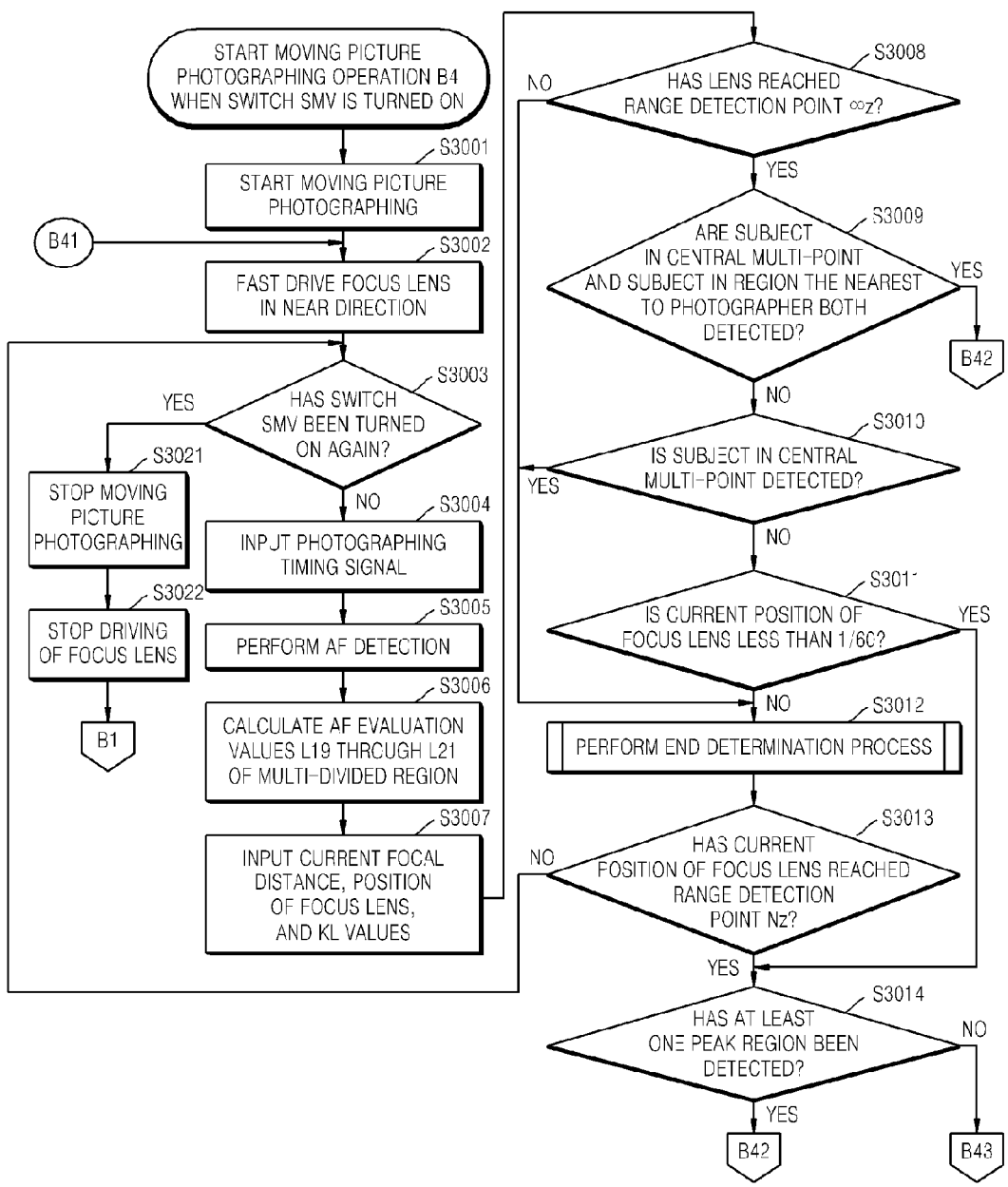
FIGS. 30A and 30B are flowcharts of applying the multi-AF method illustrated in FIGS. 7A and 7B to the contrast AF method in a moving picture mode of the digital photographing apparatus, according to an embodiment.
Figure 30B:
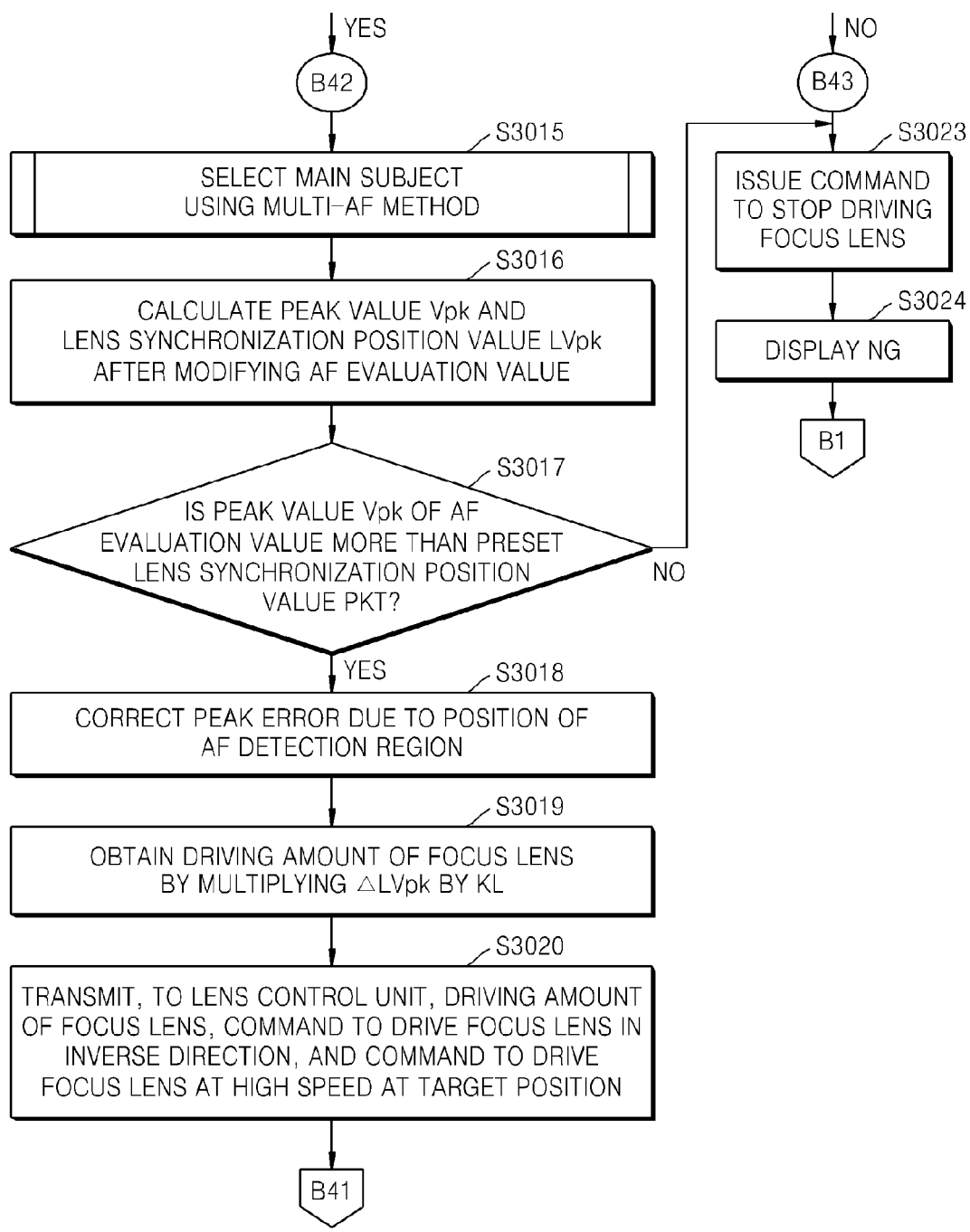

FIGS. 30A and 30B are flowcharts of applying the multi-AF method illustrated in FIGS. 7A and 7B to the contrast AF method in a moving picture mode of the digital photographing apparatus, according to an embodiment.

During moving picture photographing, the multi-AF region of FIG. 4A, 4B, or 5 may be used. Continuous AF is performed at low speed in order to reduce AF noise or a viewing angle change.

When the switch SMV for moving picture photographing is turned on, a moving picture photographing operation B4 starts. When the moving picture photographing operation B4 is initiated, moving picture photographing starts, in operation S3001, the focus lens is driven at high speed in the infinite direction, in operation S3002. The high-speed driving of the focus lens in the infinite direction is only an embodiment, and thus various modifications may be made thereto.

Operations S3004 through S3020, S3023, and S3024 are substantially the same as or similar to corresponding operations of FIGS. 28A and 28B, so they refer to FIGS. 28A and 28B. In operation S3003, it is determined whether the switch SMV for moving picture photographing has been turned on again or turned off. If it is determined that the switch SMV for moving picture photographing has been turned on again, the moving picture photographing is stopped, in operation S3021. In operation S3022, the driving of the focus lens is also stopped.

FIG. 31 is a flowchart of a multi-AF method, according to an embodiment.

First, in operation S3110, it is determined whether a magnification $\beta_{near}$ of a nearest subject is greater than a magnification of $1/15$. When the magnification $\beta_{near}$ of the nearest subject is greater than the magnification of $1/15$, current photographing is determined to be macro photographing. If the current photographing is determined to be macro photographing, a central multi-point of an image is selected, in operation S3150. On the other hand, if the magnification $\beta_{near}$ of the nearest subject is equal to or less than the magnification of $1/15$, it is determined whether the central multi-point is farthest from a photographer, in operation S3120. If the central multi-point is farthest from the photographer, a nearest multi-point is selected, in operation S3140. In other words, when the central multi-point is farthest from the photographer, a pattern as illustrated in FIG. 7A is formed. Thus, if the magnification $\beta_{near}$ of the nearest subject is less than the magnification of $\frac{1}{15}$, the nearest multi-point is selected.

If the central multi-point is not a region farthest from the photographer, a pattern as illustrated in FIG. 7B is formed.

In this case, it is determined whether a magnification $\beta_m$ of the central multi-point is greater than a magnification of $\frac{1}{60}$, in operation S3130. If the magnification $\beta_m$ is greater than the magnification of $\frac{1}{60}$, the central multi-point is selected, in operation S3150. Otherwise, the nearest multi-point is selected, in operation S3140.

After either the central multi-point or the nearest multi-point is selected, the direction of scanning is changed.

FIG. 32 is a flowchart of a multi-AF method according to another embodiment.

The multi-AF method of FIG. 32 may be used in the embodiment 2. FIG. 32 is obtained by changing the magnification of the central multi-point of the image of FIG. 31 from $\frac{1}{60}$ to $\frac{1}{100}$. In the multi-AF method of FIG. 32, it is suitable to use a magnification $\beta u$ of a region directly over the central multi-point of an image during macro photographing.

First, in operation S3210, it is determined whether the magnification $\beta_{near}$ of the central multi-point is greater than the magnification of $\frac{1}{15}$. When the magnification $\beta_{near}$ of the nearest subject is greater than the magnification of $\frac{1}{15}$, a current photographing is determined to be macro photographing. If the current photographing is determined to be macro photographing, it is determined whether the magnification $\beta u$ of the region directly over the central multi-point is greater than the magnification of $\frac{1}{15}$, in operation S3250. If the magnification $\beta u$ is greater than the magnification of $\frac{1}{15}$, the central multi-point of the image is selected, in operation S3260. On the other hand, if the magnification $\beta u$ is equal to or less than the magnification of $\frac{1}{15}$, a nearest multi-point is selected, in operation S3240.

On the other hand, when the magnification $\beta_{near}$ of the nearest subject is not greater than the magnification of $\frac{1}{15}$, it is determined whether the central multi-point is farthest from a photographer, in operation S3220. If the central multi-point is farthest from the photographer, the nearest multi-point is selected, in operation S3240. In other words, when the central multi-point is farthest from the photographer, a pattern as illustrated in FIG. 7A is formed. Thus, if the magnification $\beta_{near}$ of the nearest subject is less than the magnification of $\frac{1}{15}$, the nearest multi-point is selected.

If the central multi-point is not a region farthest from the photographer, a pattern as illustrated in FIG. 7B is formed.

In this case, it is determined whether a magnification $\beta_m$ of the central multi-point is greater than a magnification of $\frac{1}{100}$, in operation S3230. If the magnification $\beta_m$ is greater than the magnification of $\frac{1}{100}$, the central multi-point is selected, in operation S3260. Otherwise, the nearest multi-point is selected, in operation S3240.

After either the central multi-point or the nearest multi-point is selected, the direction of scanning is changed.

Figure 33:
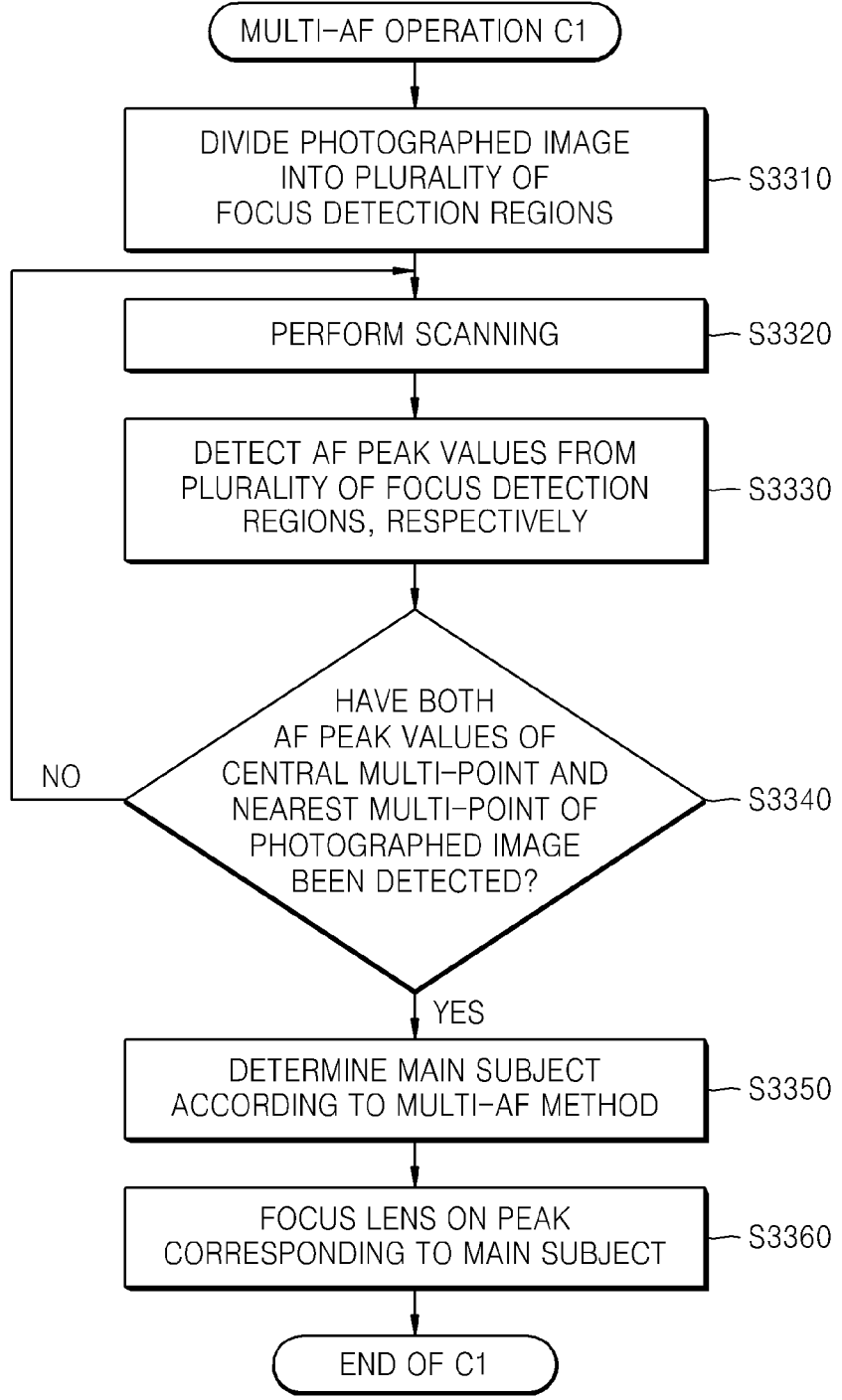
FIG. 33 is a flowchart of a method of applying a multi-AF method to the contrast AF method in the digital photographing apparatus, according to an embodiment.

FIG. 33 is a flowchart of a method of applying a multi-AF operation C1 to the contrast AF method in a digital photographing apparatus, according to an embodiment.

In operation S3310, a captured image is divided into multi-points. Operation S3310 may refer to the examples illustrated in FIGS. 3 through 5.

In operation S3320, a focus lens is driven in a Near direction or an infinite direction to perform scanning. FIGS. 12 through 19 illustrate an example of the scanning in the Near direction. FIGS. 20 through 22 illustrate an example of the scanning in the ∞ direction.

In operation S3330, AF peak values are detected from the multi-points, respectively, during the scanning. Thereafter, in operation S3340, it is determined whether both the AF peak values of a central multi-point and a near region of the captured image have been detected. If neither of the AF peak values is detected, the scanning continues.

In operation S3320, scanning is not performed all the way to a final end in the Near direction or in the ∞ direction, that is, a region from which a peak is not likely to be detected is not scanned. The possibility that a peak is detected from a region is determined according to whether an AF evaluation value monotonically increases or monotonically decreases at each lens synchronization position. This refers to FIG. 9.

Even when a peak of the central multi-point is detected in the scanning performed in operation S3320, if a peak of a nearest multi-point is not detected, the focus lens performs scanning from the infinite direction to the Near direction, and the scanning in the Near direction continues.

Even when the peak of the nearest multi-point is detected, if the peak of the central multi-point is not detected, the focus lens performs scanning from the Near direction to the infinite direction, and the scanning in the infinite direction continues. However, if the peak of the central multi-point is not detected even when the scanning was performed up to a predetermined ratio, further scanning is not performed. In this case, the predetermined magnification may be $\frac{1}{60}$ or the like. This scanning process refers to the embodiment of FIG. 17.

If it is determined in operation S3340 that both AF peak values of the central multi-point and near region of the image on the display 206 are detected, further scanning is not performed, and a main subject is determined according to the multi-AF method, in operation S3350. The multi-AF method refers to FIGS. 7A and 7B. The multi-AF method illustrated in FIGS. 7A and 7B is only an embodiment, so various changes may be made thereto.

In operation S3360, the lens is focused on a peak corresponding to the main subject.

In a digital photographing apparatus according to various embodiments, when AF peaks of a subject of a central multi-point and a subject of a near region are detected, further scanning is not performed. In addition, scanning is not performed on a region from which it is difficult to detect a peak, so that fast and accurate AF may be performed.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation on the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as the semiconductor memory 210 illustrated in FIG. 2, random-access memory (RAM), read-only memory (ROM), CD-ROMs, DVDs, magnetic tapes, hard disks, floppy disks, and optical storage devices. The computer readable recording media may also be distributed over network coupled computer systems so that the computer readable code is stored and executed in a distributed fashion. This media can be read by the computer, stored in the memory, and executed by the processor.

Also, using the disclosure herein, programmers of ordinary skill in the art to which the invention pertains can easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implement using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein can be performed in any suitable order unless otherwise indicated herein or otherwide clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical." It will also be recognized that the terms "comprises," "comprising," "includes," "including," "has," and "having," as used herein, are specifically intended to be read as open-ended terms of art. The use of the terms "a" and "an" and "the" and similar references in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A digital photographing apparatus that applies a high-speed multi-autofocusing (AF) method, the digital photographing apparatus comprising:
    a photographing lens;
    an image pickup unit configured to convert image light obtained from a subject through the photographing lens into an electrical signal to generate an image signal;
    a driving unit configured to drive a focus lens of the photographing lens;
    a calculation unit configured to calculate an AF evaluation value by performing AF on the image signal;
    a multi-AF detection unit configured to detect a peak of an AF evaluation value of each multi-point into which a captured image formed by the image signal is divided;
    a scanning unit configured to scan respective peaks of the multi-points of the captured image;
    a region detection unit configured to determine a zone where it is determined whether there is a possibility that a peak of AF evaluation values exists during scanning around a final end in the near direction or a final end in the ∞ direction by the scanning unit, and configured to invert a driving direction of the focus lens at a zone detection point before the final end of a scanning range in the near direction or the ∞ direction in response to the determination of the zone and to continue further scanning in the zone, wherein the possibility is determined according to whether the AF evaluation values monotonically increase or monotonically decrease at each lens synchronization position; and
    a main subject determination unit configured to select one of the peaks detected by the scanning unit according to a predetermined multi-AF method and determine a subject corresponding to the selected peak as a main subject, and perform contrast AF on the main subject.

2. The digital photographing apparatus of claim 1, wherein the scanning unit is further configured to scan until both peaks of the central multi-point and the nearest multi-point are detected, if at least one of the peaks of a central multi-point or a nearest multi-point is not detected.

3. The digital photographing apparatus of claim 2, wherein the main subject determination unit is further configured to apply a selection criterion of a predetermined multi-AF method, to select the peak of a central multi-point or a nearest multi-point according to the selection criterion, and to determine a subject corresponding to the multi-point where the peak is selected as a main subject, and perform the contrast AF on the main subject.

4. The digital photographing apparatus of claim 1, wherein the region detection unit is further configured to determine that a peak exists in a direction of scanning, and to continue scanning up to the final end, if the AF evaluation value increases.

5. The digital photographing apparatus of claim 1, wherein the region detection unit is further configured to determine that no peaks exist in the direction of scanning, and invert the driving direction of the focus lens at the zone detection point before an end of a scanning range, if the AF evaluation value decreases.

6. The digital photographing apparatus of claim 1, wherein:
the zone detection point is previously determined on the basis of a photographing iris value F and a permissible circle of uncertainty δ; and
the region detection unit is further configured to determine the zone at the zone detection point, wherein the zone detection point is located around the final end in a near direction or the final end in a ∞ direction.

7. The digital photographing apparatus of claim 2, wherein the scanning unit is further configured to not perform further scanning if both the peaks of the central multi-point and the nearest multi-point are detected.

8. A digital photographing apparatus that applies a high-speed multi-AF method, the digital photographing apparatus comprising:
a multi-AF detection unit configured to detect a peak of an AF evaluation value of each multi-point into which a captured image formed by an image signal is divided;
a scanning unit configured to scan respective peaks of the multi-points of the captured image;
a region detection unit configured to invert a direction of scanning in response to a determination of a zone where it is determined whether there is a possibility that a peak of AF evaluation values exists at a zone detection point before the final end of a scanning range in the near direction or the ∞ direction during scanning around a final end in a near direction or a final end in a ∞ direction by the scanning unit, and to continue further scanning in the zone; and
a main subject determination unit configured to apply a selection criterion of a predetermined multi-AF method, to select different ones of the peaks detected by the scanning unit according to different states of the selection criterion and determine a subject corresponding to the selected peak as a main subject and perform the contrast AF on the main subject.

9. The digital photographing apparatus of claim 8, wherein the region detection unit is further configured to determine the zone by a possibility that at least one peak would exist therein, wherein the possibility is determined according to whether the AF evaluation value increases or decreases at each lens synchronization position.

10. The digital photographing apparatus of claim 8, wherein:
a zone detection point is previously determined on the basis of a photographing iris value F and a permissible circle of uncertainty δ; and
the region detection unit is further configured to determine the zone at the zone detection point, wherein the zone detection point is located around the final end in a near direction or the final end in a ∞ direction.

11. The digital photographing apparatus of claim 8, wherein the scanning unit is further configured to scan peaks of a central multi-point or a nearest multi-point of the captured image when at least one of the peaks of the central multi-point or the nearest multi-point of the captured image is not detected.

12. The digital photographing apparatus of claim 11, wherein the main subject determination unit is further configured to select one of the peaks of the central multi-point and the nearest multi-point detected by the scanning unit according to the selection criterion and determine a subject corresponding to the selected peak as the main subject and perform contrast AF detection on the main subject.

13. A method of supporting a high-speed multi-AF method in a digital photographing apparatus, the method comprising:
detecting a peak of an AF evaluation value of each multi-point into which a captured image formed by an image signal is divided;
performing scanning to detect respective peaks of multi-points of the captured image;
inverting a direction of scanning in response to a determination of a zone where it is determined whether there is a possibility that a peak of AF evaluation values exists at a zone detection point before the final end of a scanning range in the near direction or the ∞ direction during scanning performed on a place around a final end in a near direction or a final end in a ∞ direction in the performing of the scanning, and performing further scanning in the zone; and
applying a selection criterion of a predetermined multi-AF method to select one of the peaks detected in the performing of the scanning according to the selection criterion, and determining a subject corresponding to the selected peak as a main subject and performing the contrast AF on the main subject.

14. The method of claim 13, wherein the inverting of the direction of scanning comprises determining the zone according to whether the AF evaluation value increases or decreases at each lens synchronization position.

15. The method of claim 13, when at least one of the peaks of a central multi-point or a nearest multi-point of the captured image is not detected, the performing of scanning performs scanning until both peaks of the central multi-point and the nearest multi-point are detected.

16. The method of claim 15, wherein the selecting of one of the peaks detected comprises selecting one of the peaks of the central multi-point and the nearest multi-point detected by the scanning unit according to the predetermined multi-AF method and determining a subject corresponding to the selected peak as the main subject and performing the contrast AF on the main subject.

17. The digital photographing apparatus of claim 1, wherein the scanning unit is further configured to scan other peaks of the multi-points of the captured image after acquiring at least a nearest multi-points or a peak of a central multi-point.

18. The digital photographing apparatus of claim 8, wherein the scanning unit is further configured to scan other peaks of the multi-points of the captured image after acquiring at least a nearest multi-points or a peak of a central multi-point.

* * * * *